US011178310B2

(12) United States Patent
Yoshida

(10) Patent No.: US 11,178,310 B2
(45) Date of Patent: Nov. 16, 2021

(54) DATA GENERATING APPARATUS GENERATING CONTROL DATA FOR COMMON USE IN PRINTING PROCESSES PERFORMED ON A PLURALITY OF PRINT EXECUTION UNITS

(71) Applicant: BROTHER KOGYO KABUSHIKI KAISHA, Aichi (JP)

(72) Inventor: Yasunari Yoshida, Aichi-ken (JP)

(73) Assignee: BROTHER KOGYO KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/896,850

(22) Filed: Jun. 9, 2020

(65) Prior Publication Data

US 2020/0304687 A1   Sep. 24, 2020

Related U.S. Application Data

(63) Continuation of application No. 16/115,621, filed on Aug. 29, 2018, now Pat. No. 10,715,701.

(30) Foreign Application Priority Data

Sep. 25, 2017  (JP) .............................. JP2017-183628

(51) Int. Cl.
*H04N 1/60*  (2006.01)
*H04N 1/405*  (2006.01)
(Continued)

(52) U.S. Cl.
CPC ......... *H04N 1/6027* (2013.01); *H04N 1/4057* (2013.01); *H04N 1/6033* (2013.01);
(Continued)

(58) Field of Classification Search
CPC .. H04N 1/6027; H04N 1/6033; H04N 1/4057; H04N 1/6036; H04N 1/6044; H04N 1/6047; H04N 1/52
(Continued)

(56) References Cited

U.S. PATENT DOCUMENTS 8,553,291 B2* 10/2013 Murakami ......... H04N 1/00883
358/300
2013/0250322 A1* 9/2013 Kawabata ............ H04N 1/6055
358/1.9
(Continued)

FOREIGN PATENT DOCUMENTS

JP   2001-320592 A   11/2001
JP   2014-053824 A   3/2014

*Primary Examiner* — Miya J Williams
*Assistant Examiner* — Darryl V Dottin
(74) *Attorney, Agent, or Firm* — Scully, Scott, Murphy & Presser, P.C.

(57) ABSTRACT

In a data generating apparatus, a processor acquires offset information indicating a deviation in a colorant usage used by a specific print execution unit from a standard amount of usage. The standard amount of usage is a standard quantity concerning colorant used by print execution units. The processor controls the specific print execution unit to print a first patch image and generates first control data using first read data based on the first patch image. The processor generates corrected first control data using the offset information. The processor controls the specific print execution unit to print a second patch image using the corrected first control data and generates second control data using second read data based on the second patch image. The first and second control data is for common use in the printing processes performed on the print execution units.

20 Claims, 17 Drawing Sheets

(51) Int. Cl.
*H04N 1/52* (2006.01)
*H04N 1/32* (2006.01)

(52) U.S. Cl.
CPC ......... *H04N 1/6036* (2013.01); *H04N 1/6044* (2013.01); *H04N 1/6047* (2013.01); *H04N 1/3263* (2013.01); *H04N 1/52* (2013.01)

(58) Field of Classification Search
USPC ........................................................ 358/521
See application file for complete search history.

(56) References Cited

U.S. PATENT DOCUMENTS

2014/0071497 A1   3/2014  Kuno
2016/0134782 A1   5/2016  Yamamuro

* cited by examiner

FIG. 3

| OFFSET Vbb | CORRECTION VALUE (CONTROL VALUE) BLACK Ck | OFFSET Vgb | CORRECTION VALUE (CONTROL VALUE) | | |
|---|---|---|---|---|---|
| | | | CYAN Cc | MAGENTA Cm | YELLOW Cy |
| −5 | 0.875 | −5 | 0.9 | 0.9 | 0.9 |
| −4 | 0.9 | −4 | 0.92 | 0.92 | 0.92 |
| −3 | 0.925 | −3 | 0.94 | 0.94 | 0.94 |
| −2 | 0.95 | −2 | 0.96 | 0.96 | 0.96 |
| −1 | 0.975 | −1 | 0.98 | 0.98 | 0.98 |
| 0 | 1 | 0 | 1 | 1 | 1 |
| 1 | 1.037 | 1 | 1.025 | 1.025 | 1.025 |
| 2 | 1.075 | 2 | 1.05 | 1.05 | 1.05 |
| 3 | 1.112 | 3 | 1.075 | 1.075 | 1.075 |
| 4 | 1.15 | 4 | 1.1 | 1.1 | 1.1 |
| 5 | 1.187 | 5 | 1.125 | 1.125 | 1.125 |

136k  136c  136m  136y

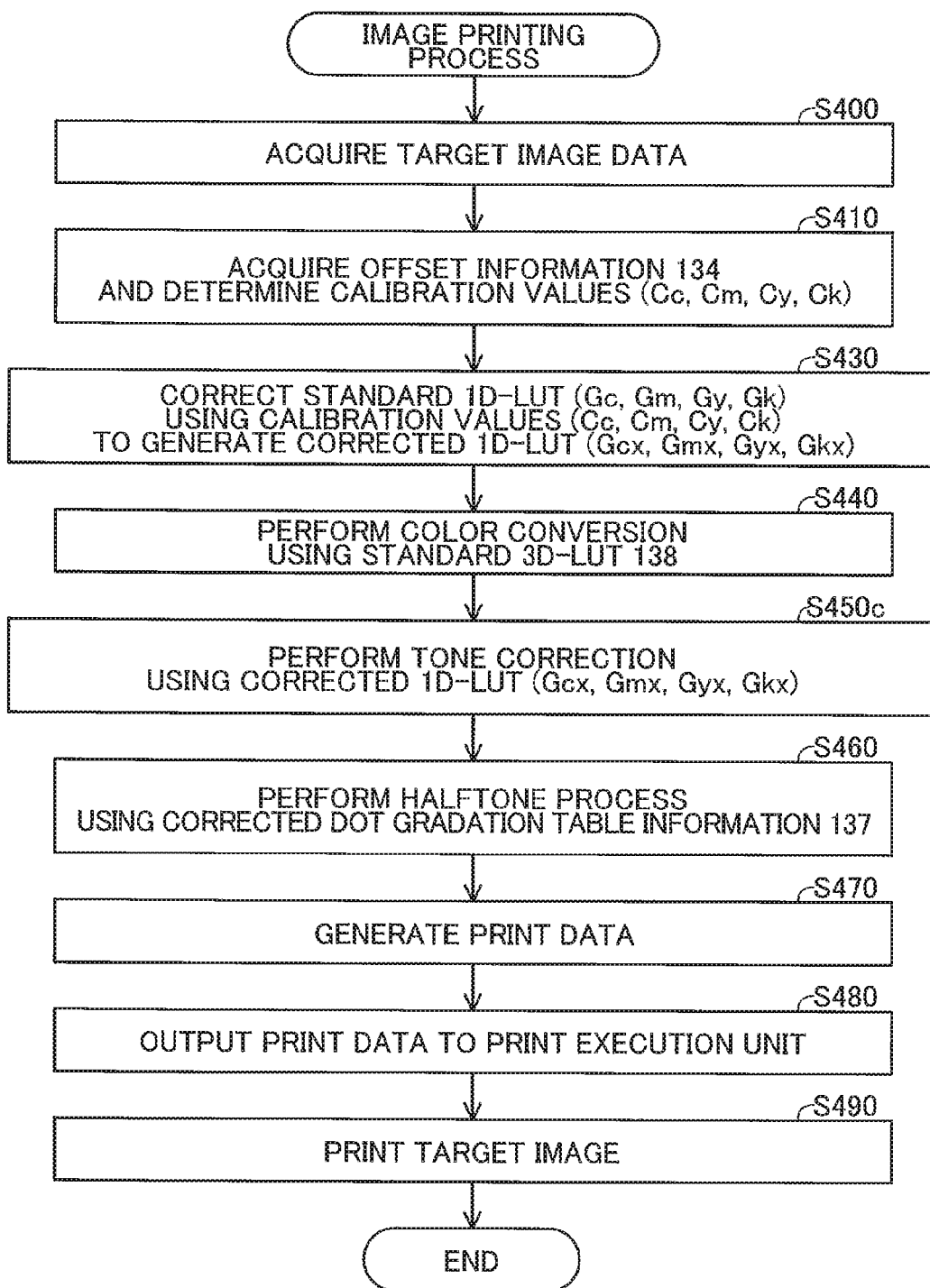

DATA GENERATING APPARATUS GENERATING CONTROL DATA FOR COMMON USE IN PRINTING PROCESSES PERFORMED ON A PLURALITY OF PRINT EXECUTION UNITS

CROSS REFERENCE TO RELATED APPLICATION

This application is a continuation application of U.S. patent application Ser. No. 16/115,621 filed on Aug. 29, 2018 and claims priority under 35 U.S.C. § 119 from Japanese Patent Application No. 2017-183628 filed Sep. 25, 2017. The entire subject matter of the applications is incorporated herein by reference.

TECHNICAL FIELD

The present disclosure relates to a technique for controlling a process for printing images.

BACKGROUND

Conventional technologies for printing images include the use of a colorant such as ink or toner. Various techniques have been proposed for improving the quality of the printed images. One technique that was proposed acquires correction values using printed patch images and corrects control data, such as values employed in the halftone process, based on these correction values.

SUMMARY

The processing load for preparing control data can be greatly reduced by generating universal control data for a plurality of printing processes performed by a plurality of print execution units of the same model, rather than generating control data individually for each print execution unit. However, there is often variation in the characteristics of the print execution units. For example, when the print execution units print images using colorant, the quantity of colorant used may differ among the plurality of print execution units. If the characteristics of a particular print execution unit deviate from standard characteristics determined for the plurality of print execution units, control data set based on the particular print execution unit may be unsuitable for the other print execution units.

In view of the foregoing, it is an object of the present disclosure to provide a technique for generating suitable control data to be used universally in a plurality of printing processes performed by respective ones of a plurality of print execution units.

In order to attain the above and other objects, the disclosure provides a data generating apparatus. The data generating apparatus includes a processor configured to perform: acquiring offset information indicating a deviation in a colorant usage used by a specific print execution unit from a standard amount of usage, the specific print execution unit being one of a plurality of print execution units, the standard amount of usage being a standard quantity concerning colorant used by the plurality of print execution units; controlling the specific print execution unit to print a first patch image based on first patch image data without using the offset information; generating first control data using first read data obtained by optically reading the first patch image, the first control data being for common use in printing processes performed on the plurality of print execution units; generating corrected first control data by correcting the first control data using the offset information, the corrected first control data being for use in the specific print execution unit; controlling the specific print execution unit to print a second patch image based on second patch image data using the corrected first control data; and generating second control data using second read data obtained by optically reading the second patch image, the second control data being for common use in the printing processes performed on the plurality of print execution units.

According to another aspect, the disclosure provides a non-transitory computer readable storage medium storing a set of program instructions for installed on and executed by a computer. The set of program instructions includes: acquiring offset information indicating a deviation in a colorant usage used by a specific print execution unit from a standard amount of usage, the specific print execution unit being one of a plurality of print execution units, the standard amount of usage being a standard quantity concerning colorant used by the plurality of print execution units; controlling the specific print execution unit to print a first patch image based on first patch image data without using the offset information; generating first control data using first read data obtained by optically reading the first patch image, the first control data being for common use in printing processes performed on the plurality of print execution units; generating corrected first control data by correcting the first control data using the offset information, the corrected first control data being for use in the specific print execution unit; controlling the specific print execution unit to print a second patch image based on second patch image data using the corrected first control data; and generating second control data using second read data obtained by optically reading the second patch image, the second control data being for common use in the printing processes performed on the plurality of print execution units.

According to still another aspect, the disclosure provides a method. The method includes: acquiring offset information indicating a deviation in a colorant usage used by a specific print execution unit from a standard amount of usage, the specific print execution unit being one of a plurality of print execution units, the standard amount of usage being a standard quantity concerning colorant used by the plurality of print execution units; controlling the specific print execution unit to print a first patch image based on first patch image data without using the offset information; generating first control data using first read data obtained by optically reading the first patch image, the first control data being for common use in printing processes performed on the plurality of print execution units; generating corrected first control data by correcting the first control data using the offset information, the corrected first control data being for use in the specific print execution unit; controlling the specific print execution unit to print a second patch image based on second patch image data using the corrected first control data; and generating second control data using second read data obtained by optically reading the second patch image, the second control data being for common use in the printing processes performed on the plurality of print execution units.

BRIEF DESCRIPTION OF THE DRAWINGS

The particular features and advantages of the disclosure as well as other objects will become apparent from the following description taken in connection with the accompanying drawings, in which:

FIG. 3 is a schematic diagram illustrating a calibration table information according to the first embodiment;

FIG. 18 is a flowchart illustrating a printing process according to still another embodiment.

DETAILED DESCRIPTION

A. First Embodiment

A1. Device Structure

Figure 1:
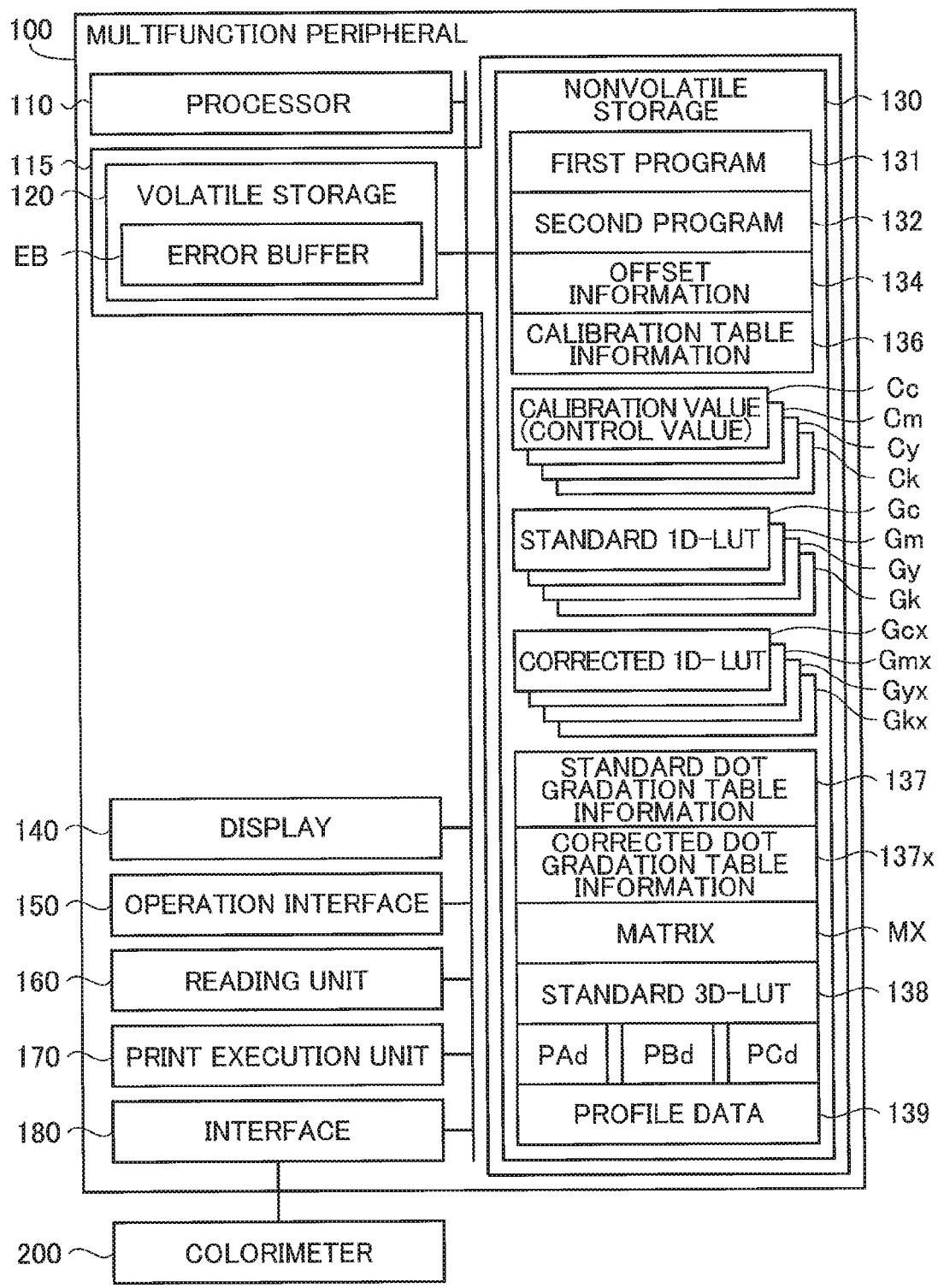
FIG. 1 is a block diagram showing a multifunction peripheral according to a first embodiment.

FIG. 1 is a block diagram showing a multifunction peripheral (MFP) 100 according to a first embodiment of the present disclosure. The MFP 100 includes a processor 110 such as a CPU for controlling the overall operations of the MFP 100, a storage 115, a display 140 for displaying images, an operation interface 150 for receiving user operations, a reading unit 160, a print execution unit 170, and an interface 180 (a network interface or a USB interface, for example) for communicating with other devices. The storage 115 includes a volatile storage 120 such as DRAM, and a nonvolatile storage 130 such as flash memory. These components are all interconnected via a bus.

The display 140 is a liquid crystal display, for example, and functions to display images. Note that an LED display, an OLED display, or another type of device for displaying images may be used in place of a liquid crystal display. The operation interface 150 is a touchscreen placed over the display 140, for example, and functions to receive input operations performed by the user. However, other types of devices operated by the user, such as buttons or levers, may be employed in place of the touch panel. By operating the operation interface 150, the user can input various commands into the MFP 100.

The reading unit 160 is a device that optically reads colors and outputs read data specifying the color values of the read colors. In the embodiment, the reading unit 160 is a scanner that optically reads an object such as printed material and generates image data of the object as the read data (hereinafter called "scan data"). The device serving as the scanner may be equipped with an optical sensor, such as a contact image sensor (CIS). The scan data specifies the color of each of a plurality of pixels arranged in a matrix. In the embodiment, the color of each pixel is represented by red (R), green (G), and blue (B) color values, with each value specifying one of 256 gradations, for example. In the following description, color values specified by the scan data will be called scan values.

The print execution unit 170 in the embodiment is an inkjet type printer. The print execution unit 170 includes a print head (not shown) provided with a plurality of nozzles for each ink color. The print execution unit 170 ejects ink droplets of each ink color through the corresponding nozzles. In the embodiment, the print execution unit 170 prints images using ink (the colorant) in the four colors cyan (C), magenta (M), yellow (Y), and black (K). Dye-based ink is used for the three colors cyan, magenta, and yellow, while a pigment-based ink is used for black. Thus, while the colorant component is different among cyan, magenta, and yellow, each colorant is of the same type (dye-based). On the other hand, the pigment-based black ink is not only a different color component from the three dye-based inks (cyan, magenta, and yellow) but is also a different type of colorant.

In the embodiment, the print execution unit 170 can form dots of ink in three sizes: large (L), medium (M), and small (S). The dot size has a correlation with the quantity of ink for one dot recorded on a recording medium. Hereinafter, the quantity of ink for one dot will be called the "dot ink quantity." The print execution unit 170 is configured with the intention that large, medium, and small sizes (i.e., dot ink quantities) will form predetermined large, medium, and small standard dot sizes (i.e., standard dot ink quantities), respectively. However, the actual dot ink quantity may differ from the standard dot ink quantity. Factors for this difference may include manufacturing errors in various members, such as ink channels (not shown) connecting ink tanks to the print head and a power supply (not shown) that drives the print head. Since the actual dot ink quantities can differ from the standard dot ink quantities, the actual amount of ink usage per unit area can differ from the ink usage per unit area based on the standard dot sizes (hereinafter called the standard ink usage). As will be described later, various control data is used in printing processes that control the print execution unit 170 to print images (e.g., dot gradation values for the halftone process and lookup tables for color conversion). In the embodiment, control data is generated while suppressing deviations in actual ink usage from the standard ink usage (described later in greater detail). Note that the standard dot ink quantities and, hence, the standard ink usages specify standard quantities specify standard quantities that are common to a plurality of print execution units of the same model as the print execution unit 170. In other words, the standard ink usages are a standard concerning quantities of ink (colorant) used by a plurality of print execution units of the same model as the print execution unit 170.

A colorimeter 200 is connected to the interface 180. The colorimeter 200 may be a device provided with a spectrophotometric sensor, a stimulus-value direct reading sensor, or a sensor employing another color measuring technique.

The volatile storage 120 includes an error buffer EB for storing density errors, as will be described later. The nonvolatile storage 130 stores a first program 131; a second program 132; offset information 134; calibration table information 136; information specifying calibration values Cc, Cm, Cy, and Ck (also called control values Cc, Cm, Cy, Ck); density-related information Gc, Gm, Gy, and Gk (also called 1 dimensional-lookup table (1D-LUT) Gc, Gm, Gy, and Gk); corrected density-related information Gcx, Gmx, Gyx, and Gkx (also called corrected 1 dimensional lookup table (1D-LUT) Gcx, Gmx, Gyx, and Gkx); dot gradation table information 137; corrected dot gradation table information 137x; a matrix MX; color conversion information 138 (also called 3 dimensional-lookup table (3D-LUT) 138); patch image data PAd, PBd, and PCd; and profile data 139. The lower case letters c, m, y, and k included in the reference numerals for calibration values Cc, Cm, Cy, and Ck and density-related information Gc, Gm, Gy, Gk, Gcx, Gmx, Gyx, and Gkx correspond to the four ink colors cyan, magenta, yellow, and black. Hence, the calibration values Cc, Cm, Cy, and Ck specify calibration values corresponding to the four ink colors cyan, magenta, yellow, and black, respectively.

The programs 131 and 132, the offset information 134, the calibration table information 136, the matrix MX, and the patch image data PAd, PBd, and PCd are prestored in the nonvolatile storage 130 (when the MFP 100 is shipped, for example). All other information is generated in a process to generate control data described below. Note that the corrected density-related information Gcx, Gmx, Gyx, and Gkx is generated in a generation process according to a second embodiment described later. The first program 131 provides instructions for the process to generate control data. The second program 132 provides instructions for a printing process used to control the print execution unit 170 to print images.

A2. Process for Generating Control Data

Figure 2:
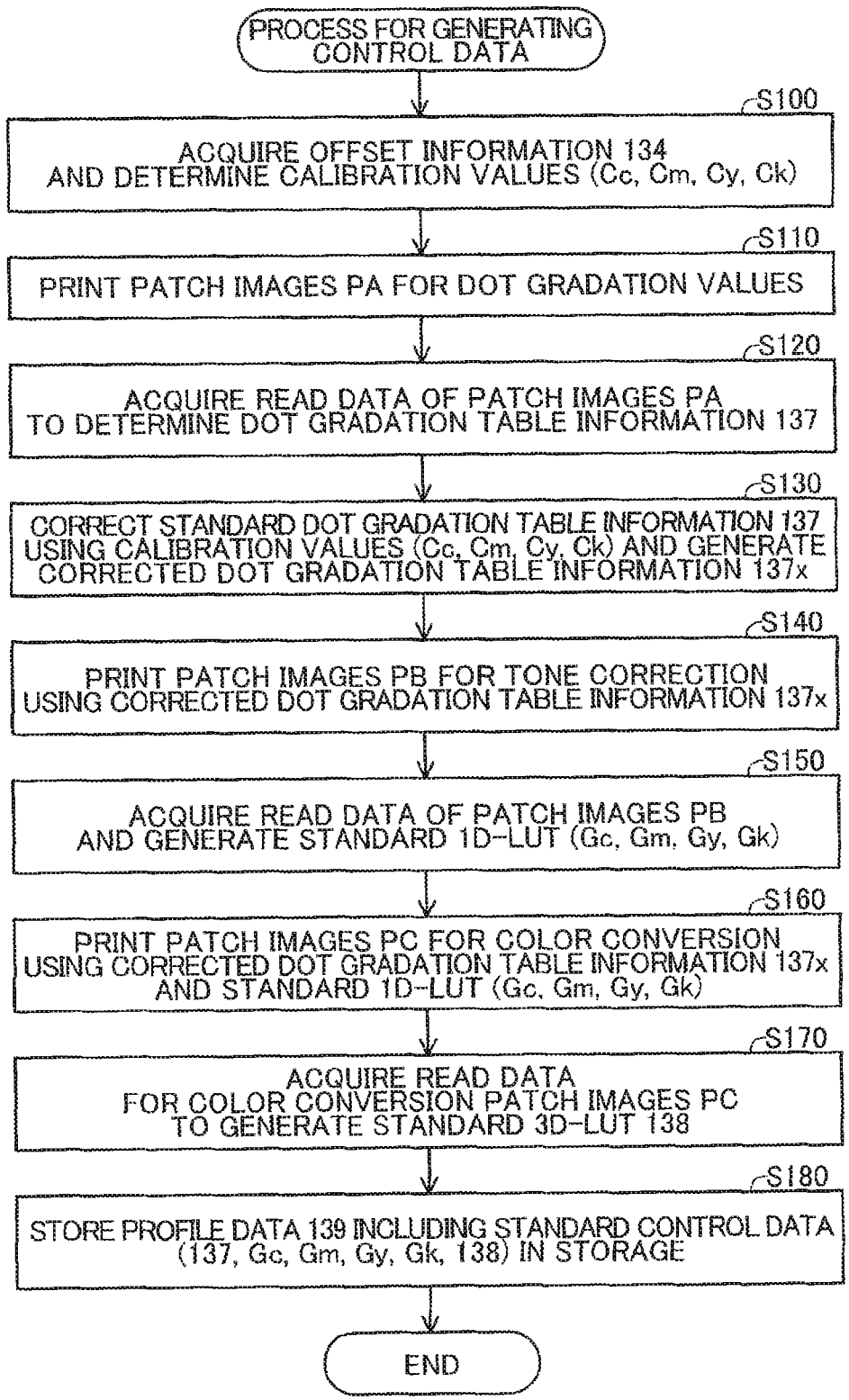
FIG. 2 is a flowchart illustrating a process for generating control data according to the first embodiment.

FIG. 2 is a flowchart illustrating steps in a process for generating control data. In response to a user command inputted via the operation interface 150, the processor 110 begins the process in FIG. 2 by executing the first program 131. In S100 at the beginning of the process, the processor 110 acquires the offset information 134. In the embodiment the offset information 134 is acquired from the nonvolatile storage 130. The offset information 134 is information specifying the amount of deviation in colorant usage by the print execution unit 170 from the standard usage. In the embodiment, the manufacturer of the MFP 100 prepares the offset information 134 in advance. Note that the processor 110 may instead acquire the offset information 134 from an external device (a server, for example) connected to the MFP 100. The offset information 134 includes a first offset Vgb and a second offset Vbb (FIG. 3).

The offset information 134 is set and stored in the nonvolatile storage 130 as described below. First, the print execution unit 170 is controlled to print patch images at preset dot recording ratios. Next, the reading unit 160 is controlled to optically read the printed patch images and to generate scan data for the patch images. The scan data is analyzed to identify color values (i.e., scan values) for the patch images. Differences are then calculated by subtracting predetermined standard color values from the color values for the patch images. Values corresponding to the differences in color values are subsequently used as offsets specified in the offset information 134. In the embodiment, an offset of 0 is correlated with a color value whose difference from the standard color value is 0, a positive offset is correlated with color values whose difference from the standard color value is positive, and a negative offset is correlated with color values whose difference from the standard color value is negative.

The offset of 0 indicates that the color value of a patch image is equivalent to the standard color value, i.e., that the actual ink usage is the same as the standard ink usage. A positive offset indicates that the color value of the patch image is greater than the standard color value, i.e., that the patch image is light. A light patch image means that the actual ink usage is less than the standard ink usage. Hence, a positive offset signifies that it is preferable to increase the amount of ink usage. Conversely, a negative offset indicates that the color value of the patch image is smaller than the standard color value, i.e., that the patch image is dark. A dark patch image signifies that the actual ink usage is greater than the standard ink usage. Hence, a negative offset indicates that it is preferable to reduce the amount of ink usage.

The difference between actual ink usage and standard ink usage (hereinafter called the "ink quantity difference") may differ according to the type of ink (dye-based ink and pigment-based ink, for example). In the embodiment, the offset information 134 includes an offset for dye-based ink (Vgb), and an offset for pigment-based ink (Vbb).

Each offset may be determined using a single patch image. The ink quantity difference may also be different according to color (density, for example). Therefore, by determining each offset based on a plurality of patch images having different densities, it is possible to set each offset suitable for various colors. As will be described below, each offset in the embodiment is set using a plurality of patch images.

In the embodiment, the offset for dye-based ink (Vgb) is determined using patch images formed of dye-based ink (magenta ink in this example). The offset for pigment-based ink (Vbb) is determined using patch images formed in pigment-based ink (black ink in this example). For example, each offset is determined using six patch images having different combinations of ink usage and dot size. Ink usage is set to one of 20% and 30%. Here, the ink usage is represented by a dot recording ratio, where a ratio of 100% signifies that a dot is formed for each pixel. The dot recording ratio is a parameter representing density. Hence, ink usage can be used to express density. The dot size is set to one of large (L), medium (M), and small (S).

The processor 110 analyzes scan data for the printed patch images and identifies a color value for each of the six patch images. The color value for a specific color component (hereinafter called the "process color value") is used as the color value for the patch image. In the embodiment, the value of the color component that is the complementary color to the color of ink is used as the process color value. In this example, the color value for green is used as the process color value in a case where the patch image is printed using magenta ink. In a case where the patch image is printed using black ink, the value of any color component is used as the process color value (the color value for blue is used in the embodiment). Note that the color value for the patch image (i.e., the scan value) may be corrected based on properties of the reading unit 160.

A standard color value is associated with each of the six patch images in advance. Using the six patch images, the processor 110 calculates the difference in each color value from the corresponding standard color value. When the actual ink usage of the print execution unit 170 deviates from the standard ink usage, the ratio of standard ink usage to actual ink usage is normally about the same for different dot sizes and dot recording ratios. For example, if the actual ink usage is greater than the standard ink usage, the color value for each of the six patch images is darker than the corresponding standard color value. However, the ratio of the change in color value (the scan value in this case) to the change in ink usage is not fixed, but rather varies according to ink usage. That is, the relationship between ink usage and color value is nonlinear. For example, when the actual ink usage is greater than the standard ink usage, the color value difference varies among the six patch images.

In the embodiment, relationships between color values of the patch images and offsets are predetermined through experimentation so that, when the actual ink usage deviates from the standard ink usage, the processor 110 can acquire the same approximate offset corresponding to the ratio of standard ink usage to actual ink usage based on the color value for each of the six patch images.

As described above, relationships between offsets and the color values of patch images (scan values in this case) can be set through experimentation. As an example of these experiments, a plurality of patch images with slightly different dot recording ratios are printed, and the scan values of the patch images are acquired. Through this process, it is possible to obtain relationships between dot recording ratios and scan values. Since the dot recording ratio is equivalent to ink usage per unit area, a correspondence between actual ink usage and the scan value can be identified from these relationships. Using the identified relationships, it is possible to set relationships between scan values and offsets.

A standard scan value (i.e., a standard color value) corresponding to an offset of 0 may be set as desired to obtain preferable printing results. For example, the scan values acquired from patch images printed using a preselected standard MFP 100 may be used as the standard scan values.

The processor 110 identifies six offsets from the six patch images using the relationships between color values of patch images and offsets described above. The average value of the six offsets identified from the six patch images is used as the offset specified by the offset information 134. Note that the offset for the offset information 134 is not limited to the average value of the six offsets. Any of various values expressed as a function of the six offsets may be used, including the average, mode, median, maximum, or minimum. Note that the offset may also be corrected using a parameter influencing actual ink usage (for example, the temperature of the print head while printing the patch image).

In S100 of FIG. 2 the processor 110 references the calibration table information 136 using each offset specified by the offset information 134 to determine the calibration value. FIG. 3 is a conceptual table showing an example of the calibration table information 136. The calibration table information 136 sets relationships between offsets and calibration values. In the embodiment, the calibration table information 136 defines four relationships 136c, 136m, 136y and 136k for the four ink colors cyan, magenta, yellow, and black. The three relationships 136c, 136m, and 136y indicates that the cyan calibration value Cc, magenta calibration value Cm, and yellow calibration value Cy are correlated to a common first offset Vgb identified using the patches formed in magenta ink. The relationship 136k for black indicates that the black calibration value Ck is correlated to a second offset Vbb identified using patches formed in black ink. In the example of FIG. 3, relationships for each ink color are set for eleven combinations of offsets and calibrations values. For undefined offsets, calibration values including values having decimals are determined through interpolation.

Each of the calibration values Cc, Cm, Cy, and Ck is an index that is related to the ratio of standard ink usage to actual ink usage. In the embodiment, each of the calibration values Cc, Cm, Cy, and Ck is set so that the standard ink usage for the corresponding color can be obtained by multiplying the actual ink usage for the corresponding color by corresponding one of the calibration values Cc, Cm, Cy, and Ck. Each of the calibration values Cc, Cm, Cy, and Ck is "1" when corresponding one of offsets Vgb and Vbb is 0. A value of "1" for each of the calibration values Cc, Cm, Cy, and Ck indicates that calibration of ink usage is unnecessary (i.e., the calibration amount is 0). Each of the calibration values Cc, Cm, Cy, and Ck is greater than "1" when corresponding one of the offsets Vgb and Vbb is greater than 0. Each of the calibration values Cc, Cm, Cy, and Ck greater than "1" indicates that the corresponding standard ink usage is greater than the actual ink usage. Each of the calibration values Cc, Cm, Cy, and Ck is less than "1" when corresponding one of the offsets Vgb and Vbb is less than 0. Each of the calibration values Cc, Cm, Cy, and Ck less than "1" indicates that the corresponding standard ink usage is less than the actual ink usage.

Desirable relationships between the offsets Vgb and Vbb and the calibration values Cc, Cm, Cy, and Ck can be found through experiments to evaluate various calibration results obtained from various calibration values (and specifically, post-calibration printing results). As shown in FIG. 3 of the embodiment, the same calibration value is associated with the same first offset Vgb for each of cyan, magenta, and yellow. However, calibration values may be set differently among two or more ink colors for at least some of the first offsets Vgb.

In S100 of FIG. 2, the processor 110 stores information specifying the calibration values Cc, Cm, Cy, and Ck determined above in the storage 115 (the nonvolatile storage 130, for example). In S110 of FIG. 2, the processor 110 controls the print execution unit 170 to print a plurality of patch images PA with different dot sizes based on the patch image data PAd in order to generate the dot gradation table information 137.

Figure 4A:
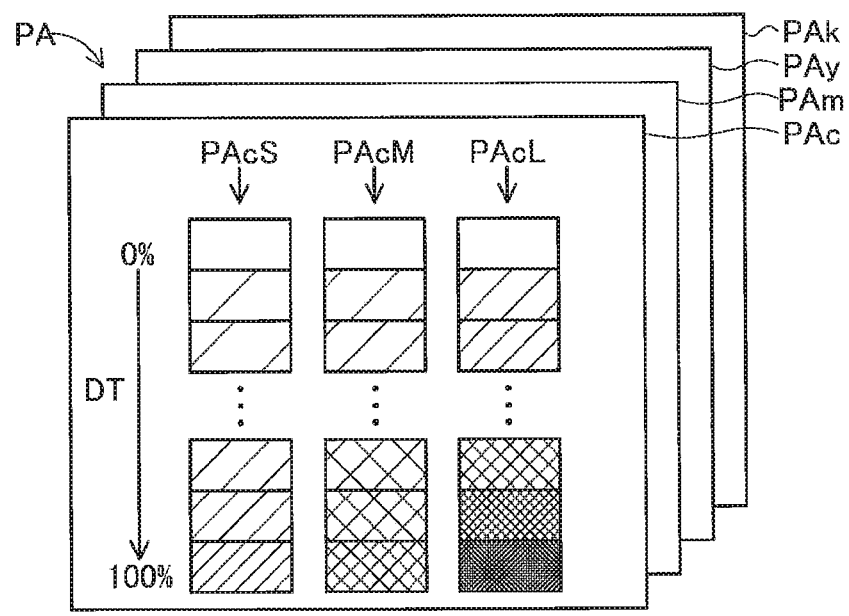
FIG. 4(A) is an explanatory diagram showing patch images for a plurality of dot sizes according to the first embodiment.

FIG. 4(A) is an explanatory diagram showing sample patch images PA for a plurality of dot sizes. The patch images PA include pluralities of patch images PAc, PAm, PAy, and PAk for cyan, magenta, yellow, and black. The example in FIG. 4(A) shows the plurality of patch images PAc for cyan. The patch images PAc further include a plurality of patch images PAcS formed with small dots of cyan, a plurality of patch images PAcM formed with medium dots of cyan, and a plurality of patch images PAcL formed with large dots of cyan. Each of the patch images formed with the same dot size has a different dot recording ratio DT. The dot recording ratios DT for the patch images are distributed over the entire range from 0% to 100%. While not shown in the drawing, each of the patch images PAm, PAy, and PAk for magenta, yellow, and black also includes a plurality of patch images having varying combinations of dot recording ratios DT and dot sizes, just as with the patch images PAc for cyan.

Note that the patch image data PAd in the embodiment is print data specifying the patch images PA. Print data is image data in a format that can be interpreted by the print execution unit 170. The processor 110 controls the print execution unit 170 to print an image by supplying the print data to the print execution unit 170.

In S120 of FIG. 2, the colorimeter 200 is used to read each of the patch images PA and generate read data specifying the optical density of each patch image PA. For example, the user operates the colorimeter 200 to control the colorimeter 200 to read the paper on which the patch images PA are printed. Alternatively, the colorimeter 200 may be configured to acquire the printed paper automatically from the print execution unit 170 and to read the patch images PA printed thereon.

The processor 110 acquires the read data from the colorimeter 200. Next, the processor 110 analyzes the read data to identify the ratios of dot ink quantities among large dots, medium dots, and small dots, for each ink color.

Figure 4B:
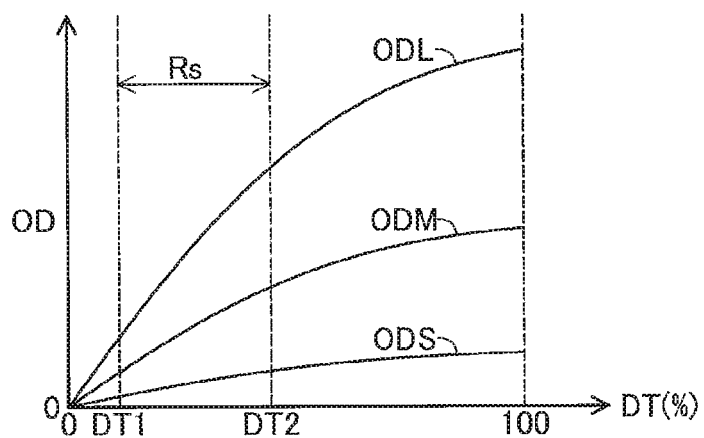
FIG. 4(B) is a graph showing a relationship between a dot recording ratio and an optical density according to the first embodiment.

FIG. 4(B) is a graph showing a sample relationship between the dot recording ratio DT and the optical density OD based on the read data, wherein the horizontal axis represents the dot recording ratio DT and the vertical axis represents the optical density OD. The graph includes three lines ODL, ODM, and ODS representing large dots, medium dots, and small dots, respectively. As shown in the graph, the optical density OD is larger for larger dot sizes when the dot recording ratio DT is the same. The optical density OD also increases as the dot recording ratio DT increases. Here, the inclination of each line, i.e., the ratio of the change in optical density OD to the change in dot recording ratio DT decreases gradually as the dot recording ratio DT increases. Within a range Rs of relatively small dot recording ratios DT (and specifically, within a range Rs greater than or equal to a lower limit DT1 and less than or equal to an upper limit DT2 in the graph of FIG. 4(B)) the optical density OD for each of the large dots, the medium dots, and the small dots changes nearly linearly in response to a change in the dot recording ratio DT.

The processor 110 analyzes the read data to identify color values specifying the optical density OD corresponding to the dot recording ratio DT within the range Rs for each of the patch images PA (hereinafter called the density color values). Next, the processor 110 calculates a density ratio for each dot size. The density ratio at a certain optical density is a value equivalent to the ratio of the optical density OD at the certain optical density for each dot size to the optical density OD at the certain optical density for large dot size.

Figure 4C:
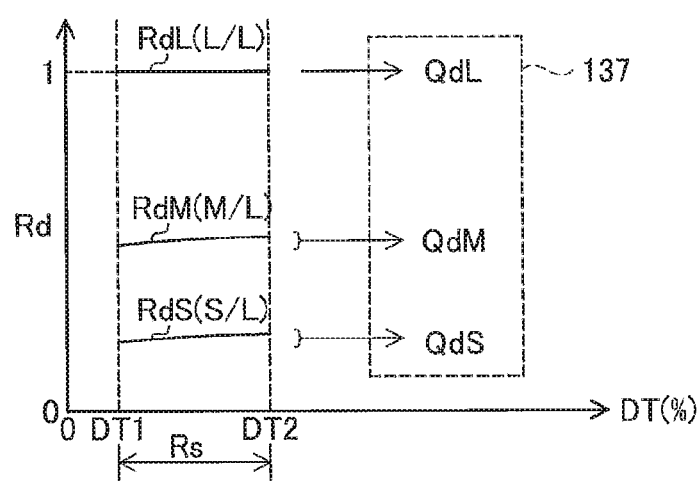
FIG. 4(C) is a graph showing relationships between the dot recording ratio and a density ratio according to the first embodiment.

FIG. 4(C) is a graph showing sample relationships between the dot recording ratio DT and a density ratio Rd, wherein the horizontal axis represents the dot recording ratio DT and the vertical axis represents the density ratio Rd. The graph includes three lines RdL, RdM, and RdS that represent the density ratio Rd for large dots, medium dots, and small dots, respectively. The density ratios Rd calculated above represent the ratios of dot ink quantities for each dot size to the dot ink quantity for large dots.

The large dot ratio RdL is "1" regardless of the dot recording ratio DT, while the medium dot ratio RdM and small dot ratio RdS may vary according to the dot recording ratio DT. However, as described with reference to FIG. 4(B), the optical density OD for large dots, medium dots, and small dots changes nearly linearly in response to changes in dot recording ratio DT within the range Rs of dot recording ratios DT. Hence, the medium dot ratio RdM and small dot ratio RdS are nearly constant.

Note that a predetermined range is used for the range Rs. However, the processor 110 may analyze relationships between density color values and dot recording ratios DT to identify a range Rs in which the density color values change nearly linearly to changes in dot recording ratio DT.

The processor 110 sets dot gradation values QdL, QdM, and QdS for large dots, medium dots, and small dots, respectively, based on the corresponding ratios RdL, RdM, and RdS for large dots, medium dots, and small dots. In a printing process according to the embodiment that will be described later in greater detail, a dot pattern is set through a halftone process using an error diffusion method. In this halftone process, the processor 110 sets dot patterns for various gradation values on the assumption that the dot gradation value at one pixel position is expressed by a dot formed at the pixel position. Generally, the color of a gradation value to be printed is rendered overall by forming dots at a plurality of pixel positions. Here, because, as described later, the dot gradation value is subtracted from the input value for calculating the error value in the error diffusion process, the number of dots required for producing the specified gradation value increases as the dot gradation value grows smaller. Hence, reducing the dot gradation value increases the number of dots, resulting in a greater ink usage per unit area. Conversely, increasing the dot gradation value decreases the number of dots, thereby reducing ink usage per unit area.

The processor 110 sets the dot gradation value QdL for large dots (hereinafter called the large dot gradation value QdL) to a predetermined value. For example, the large dot gradation value QdL is set to a value slightly greater than the maximum gradation value (1.1 times the maximum gradation value, for example), which is the largest value within the range of possible input values for the halftone process (possible gradation values for cyan, magenta, yellow, and black). As an example, the large dot gradation value QdL may be set to 1125 when the range of gradation values is the range from 0 to 1023.

Generally, the dot gradation value for the largest dot is set to a value greater than or equal to the maximum gradation value for the following reason. Let's assume that the dot gradation value for the largest dot were set smaller than the maximum gradation value. When printing a color at the maximum gradation value in this case, excessive dots would be formed due to accumulated error, even when the dot recording ratio of the largest dot is set to 100%. In order to reduce the occurrence of this problem, the dot gradation value for the largest dot is set to a value greater than or equal to the maximum gradation value. In the embodiment, the processor 110 also corrects the dot gradation value using the calibration values Cc, Cm, Cy, and Ck, as will be described later. The pre-corrected large dot gradation value QdL is set to a value greater than the maximum gradation value so that the corrected large dot gradation value is greater than or equal to the maximum gradation value.

The processor 110 sets the dot gradation value QdM for medium dots (hereinafter called the medium dot gradation value QdM) to a value obtained by multiplying the medium dot ratio RdM by the large dot gradation value QdL. The processor 110 sets the dot gradation value QdS for small dots (hereinafter called the small dot gradation value QdS) to a value obtained by multiplying the small dot ratio RdS by the large dot gradation value QdL. Note that the ratios RdM and RdS may vary within the range Rs in response to changes in the dot recording ratio DT. The processor 110 sets the medium dot gradation value QdM and small dot gradation value QdS using average values for the respective ratios RdM and RdS in the range Rs.

The dot gradation values QdL, QdM, and QdS are set for each of the ink colors cyan, magenta, yellow, and black. The processor 110 stores the dot gradation table information 137 specifying the dot gradation values QdL, QdM, and QdS for each ink color in the storage 115 (the nonvolatile storage 130, for example). In the following description, one of the lower case letters c, m, y, and k specifying the colors of ink cyan, magenta, yellow, and black, respectively, is appended to the reference numeral when differentiating between the dot gradation values QdL, QdM, and QdS for specific colors of ink. For example, large dot gradation value QdLc denotes the large dot gradation value for cyan.

As described above, when the actual ink usage of the print execution unit 170 deviates from the standard ink usage, this characteristic of deviation is normally about the same irrespective of dot size and dot recording ratio DT. For example, when the actual ink usage is greater than the standard ink usage, the optical density OD of the patch images PA for each of large dots, medium dots, and small dots is greater than the optical density OD when the patch images PA are printed according to the standard ink usage. The density ratios RdL, RdM, and RdS are ratios calculated on the basis of the optical densities OD for two dot sizes. Using these ratio can mitigate the effects of the difference between the actual ink usage and the standard ink usage on the density ratios RdL, RdM, and RdS, thereby mitigating the effects of differences in ink usage on the dot gradation values QdL, QdM, and QdS for each ink color (i.e., the dot gradation table information 137). This dot gradation table information 137 specifies dot gradation values that are suitable for a print execution unit that prints standard dot ink quantities (hereinafter called a standard print execution unit). Note that the standard print execution unit may be a virtual print execution unit. That is, standard dot ink quantities (and hence standard ink usage) may be design values that differ from the dot ink quantities (and hence ink usage) of actual print execution units. Alternatively, the standard print execution unit may be an actual print execution unit. In other words, the standard dot ink quantities (and hence the standard ink usage) may be dot ink quantities (and hence the ink usage) of an actual standard print execution unit.

Figure 5:
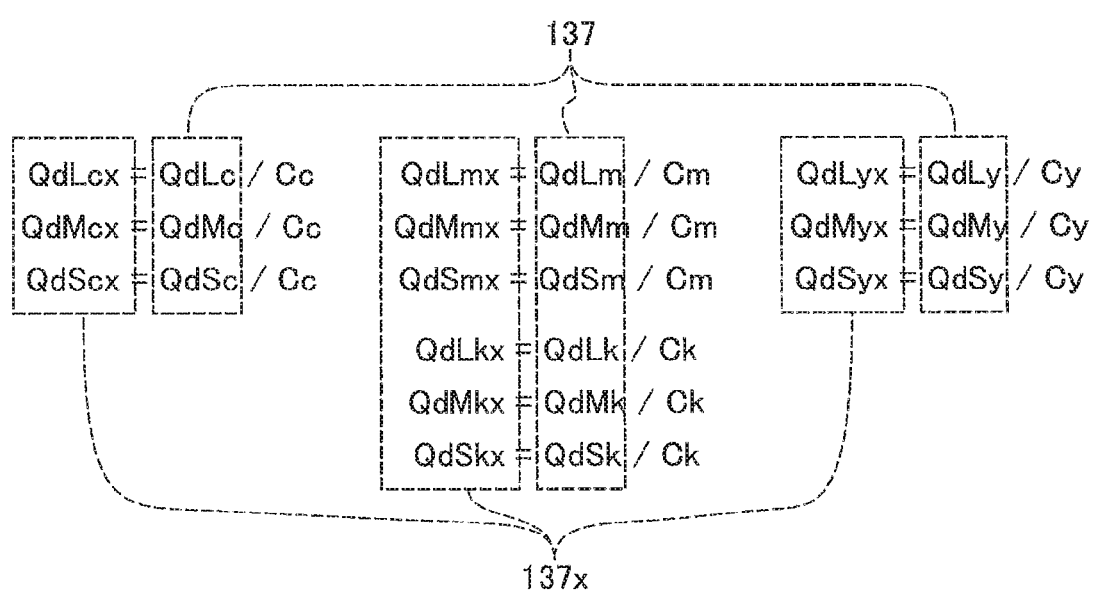
FIG. 5 is an explanatory diagram showing corrected dot gradation table information according to the first embodiment.

In S130 of FIG. 2 the processor 110 corrects the dot gradation table information 137 using the calibration values Cc, Cm, Cy, and Ck to generate the corrected dot gradation table information 137x. FIG. 5 is an explanatory diagram showing the corrected dot gradation table information 137x. As illustrated in the drawing, the corrected dot gradation values are set by dividing the dot gradation values specified by the dot gradation table information 137 by the corresponding ink calibration values. For example, the value for a corrected dot gradation value QdMcx of a medium cyan dot is acquired by dividing the pre-corrected dot gradation value QdMc by the cyan calibration value Cc. The processor 110 stores the corrected dot gradation table information 137x specifying corrected dot gradation values in the storage 115 (the nonvolatile storage 130, for example).

The cyan calibration value Cc is smaller than 1 when the dot ink quantity of cyan ink is greater than the standard dot ink quantity. Accordingly, the corrected dot gradation value for cyan is larger than the pre-corrected dot gradation value. As described above, the number of dots is decreased when the dot gradation value is increased. Using these corrected dot gradation values in the halftone process prevents the printed colors from being darker than the standard colors when the dot ink quantities are greater than the standard dot ink quantities. Conversely, since the cyan calibration value Cc is greater than 1 when the dot ink quantity for cyan ink is smaller than the standard dot ink quantity, the corrected dot gradation value for cyan is smaller than the pre-corrected dot gradation value. Hence, the number of dots to be formed is increased. Accordingly, when using the corrected dot gradation values in the halftone process, the printed colors are prevented from being lighter than the standard colors when the dot ink quantities are smaller than the standard dot ink quantities. The same process is true for the other colors.

Figure 6A:
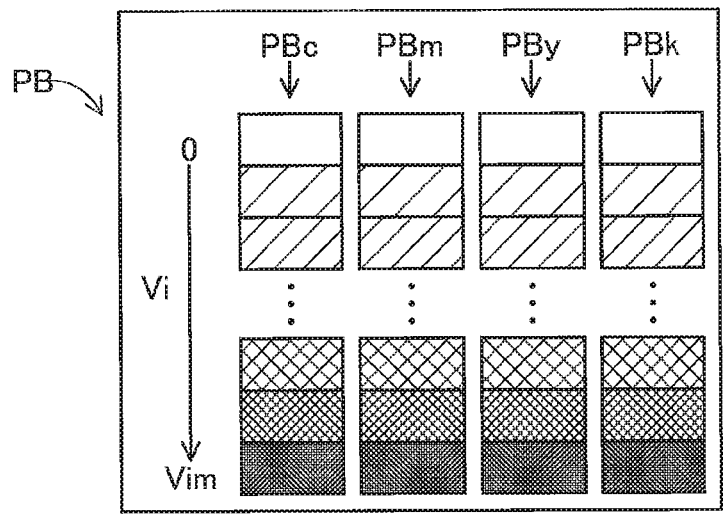
FIG. 6(A) is a schematic diagram showing a plurality of tone correction patch images according to the first embodiment.

In S140 of FIG. 2, the processor 110 controls the print execution unit 170 to print a plurality of tone correction patch images PB using the patch image data PBd for a plurality of tone correction patch images and using the corrected dot gradation table information 137x. FIG. 6(A) is a conceptual drawing showing an example of a plurality of tone correction patch images PB. The tone correction patch images PB include a plurality of patch images PBc printed in cyan ink, a plurality of patch images PBm printed in magenta ink, a plurality of patch images PBy printed in yellow ink, and a plurality of patch images PBk printed in black ink. Each patch image PB is formed of a uniform color. The patch image data PBd specifies colors in gradation values for each of the color components corresponding to the plurality of ink colors that can be used for printing (gradation values for cyan, magenta, yellow, and black in the embodiment).

Each of the patch images PB corresponding to the same ink color has a different gradation value Vi for the color component of the corresponding ink color (hereinafter called the corresponding color component), while the gradation values for the other components are 0. For example, the three color components magenta, yellow, and black all have a gradation value of 0 for the patch images PBc for cyan ink. The gradation value for cyan is different for each of the patch images PBc. The gradation values Vi for the corresponding color component are distributed over the entire range from 0 to a maximum gradation value Vim.

Figure 6B:
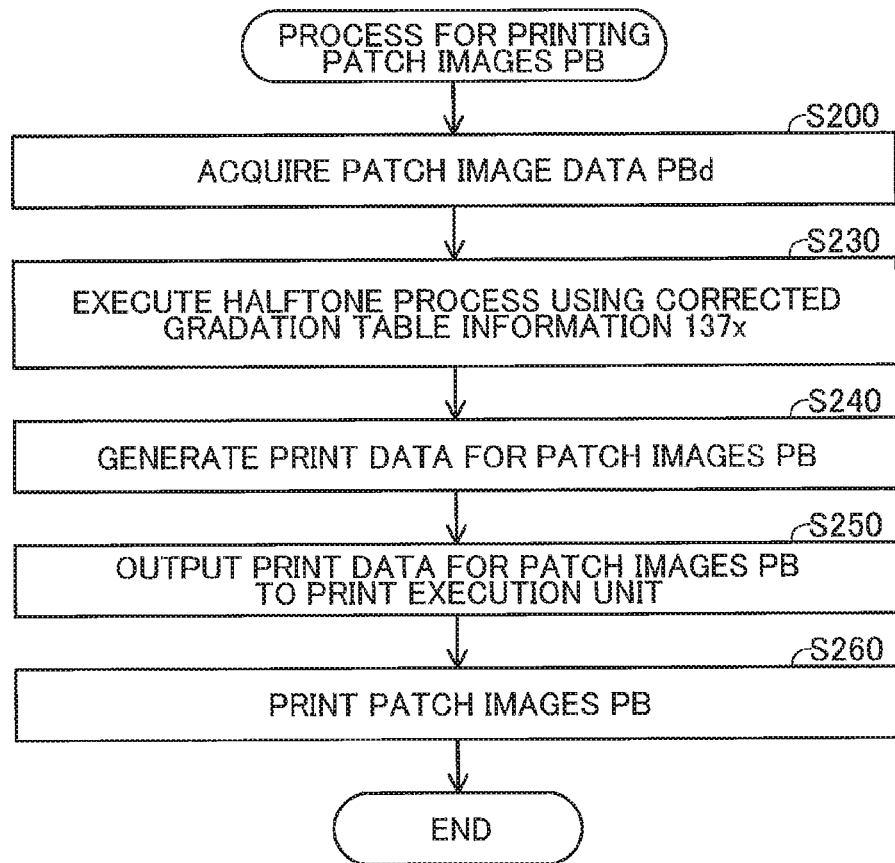
FIG. 6(B) is a flowchart showing a process for printing the patch images according to the first embodiment.

FIG. 6(B) is a flowchart showing steps in a process for printing the patch images PB. In S200 of FIG. 6(B), the processor 110 acquires the patch image data PBd from the nonvolatile storage 130, for example.

Figure 7A:
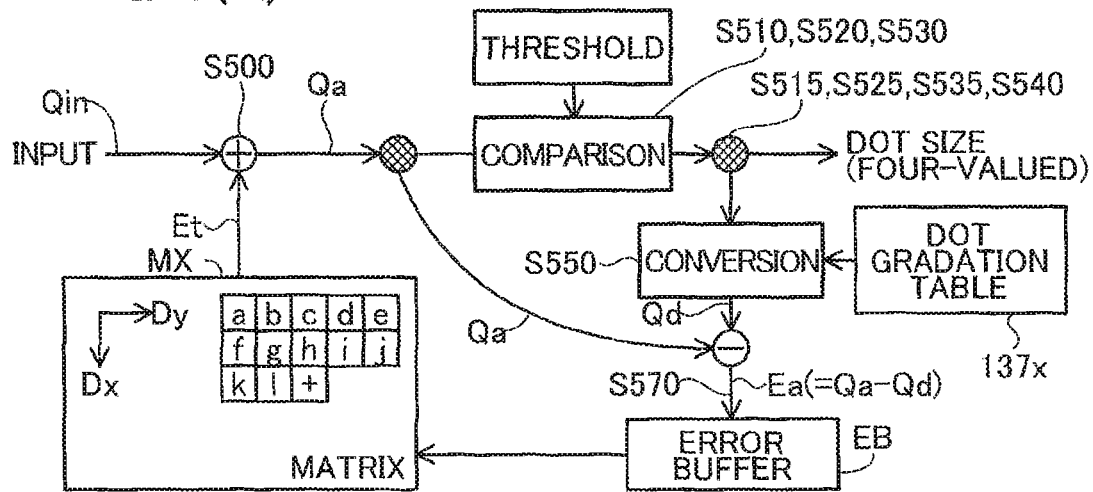
FIG. 7(A) is a schematic diagram illustrating a halftone process according to the first embodiment.
Figure 7B:
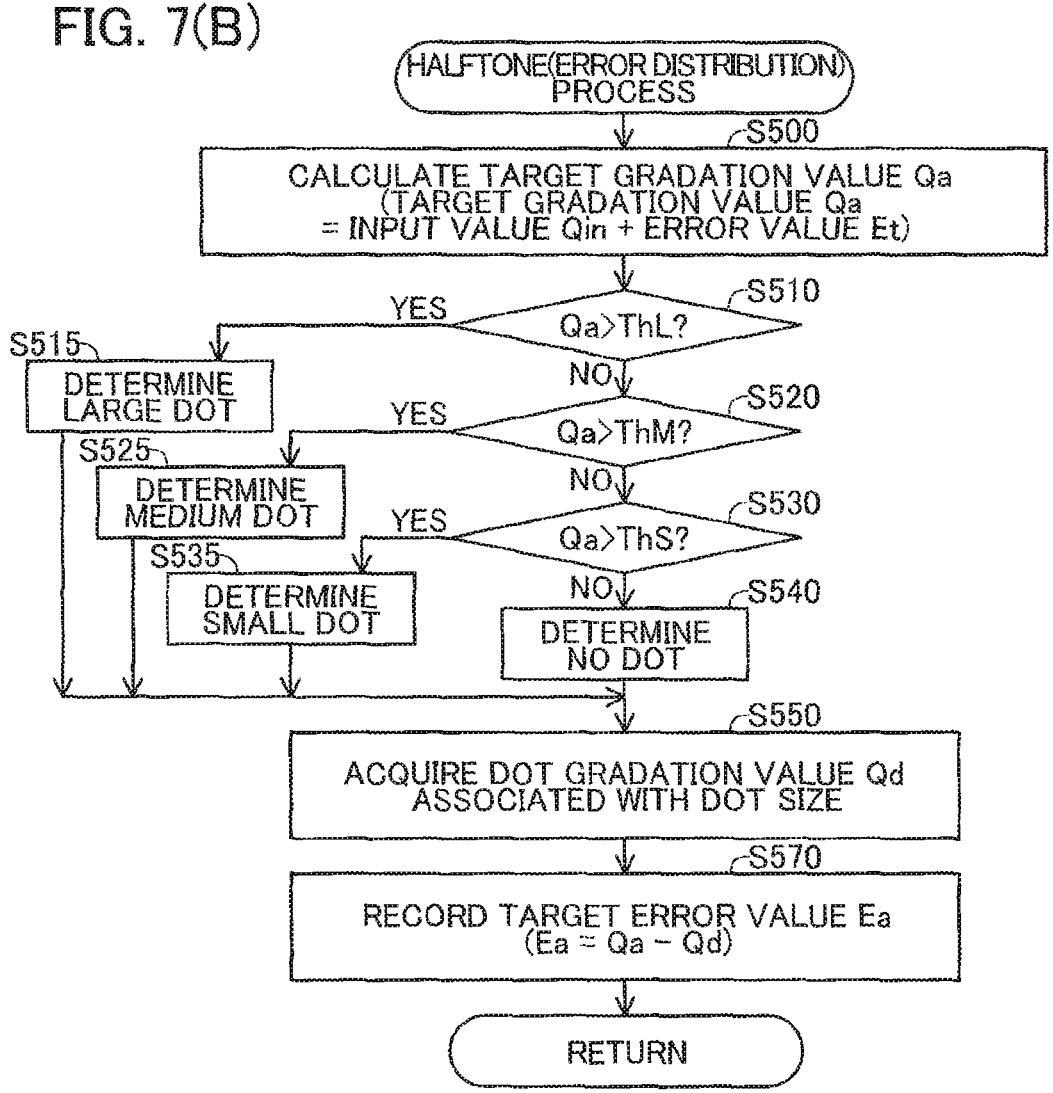
FIG. 7(B) is a flowchart illustrating the halftone process according to the first embodiment.

In S230 the processor 110 references the corrected dot gradation table information 137x to execute a halftone process on the patch image data PBd. FIG. 7(A) is a conceptual drawing of the halftone process, while FIG. 7(B) is a flowchart illustrating steps in the halftone process. The halftone process will be described next while referring to the steps in FIG. 7(B).

In S500 at the beginning of the halftone process, the processor 110 calculates an error value Et for the print pixel being subjected to this process (hereinafter referred to as the "target pixel") using the matrix MX and the error buffer EB. As will be described later, the error buffer EB stores a density error (i.e., a gradation error value) for each pixel. The matrix MX is a Jarvis, Judice, and Ninke matrix, for example, that assigns weights greater than 0 to pixels arranged at prescribed relative positions around the target pixel (peripheral pixels). In the matrix MX of FIG. 7(A), the "+" symbol represents the target pixel, and weights a–1 are assigned to the prescribed peripheral pixels. The values of the weights a–1 total "1". Based on these weights, the processor 110 calculates the error value Et of the target pixel to be the weighted sum of error values for the peripheral pixels. Next, the processor 110 calculates a target gradation value Qa as the sum of the error value Et and a gradation value of the target pixel (hereinafter called the "input gradation value Qin"; the gradation value of cyan, for example). Note that the halftone process is performed for each color component corresponding to each color of ink. The gradation value Vi described in FIG. 6(A) is an example of the input gradation value Qin.

In the subsequent processes of S510-S540, the processor 110 sets the dot size of the target pixel based on the magnitude of the target gradation value Qa relative to three thresholds ThL, ThM, and ThS. In the embodiment, the input gradation value Qin is expressed as one of 1024 levels, from 0 to 1023. The large dot threshold ThL is the threshold for outputting a large dot. The medium dot threshold ThM is the threshold for outputting a medium dot. The small dot threshold ThS is the threshold for outputting a small dot. In the embodiment, ThL>ThM>ThS=0.

The processor 110 sets the dot size as follows.

A) When target gradation value Qa>large dot threshold ThL (S510: YES), dot size="large dot" (S515)
B) When target gradation value Qa large dot threshold ThL and target gradation value Qa>medium dot threshold ThM (S510: NO, S520: YES), dot size="medium dot" (S525)
C) When target gradation value Qa≤medium dot threshold ThM and target gradation value Qa>small dot threshold ThS (S520: NO, S530: YES), dot size="small dot" (S535)
D) When target gradation value Qa≤small dot threshold ThS (S530: NO), dot size="no dot" (S540)

In S550 the processor 110 references the corrected dot gradation table information 137x and acquires the gradation value associated with the dot size determined above (hereinafter referred to as the "dot gradation value Qd"). When the dot size is "no dot," the dot gradation value is "0".

In S570 the processor 110 calculates a target error value Ea according to the following equation.

Target error value $Ea$=target gradation value $Qa$–dot gradation value $Qd$

The processor 110 records the target error value Ea calculated according to the above equation in the error buffer EB as the error value for the target pixel. In the process of S500, the target error value Ea recorded in the error buffer EB is used as an error value for peripheral pixels of different target pixels.

As described above, the processor 110 sets a dot size for each print pixel in each color of ink.

In S240 of FIG. 6(B), the processor 110 generates print data using the results of the halftone process (and specifically the dot size of each pixel determined in S515, S525, S535, and S540 of FIG. 7(B)). The print data is data representing results of the halftone process in a format that can be interpreted by the print execution unit 170.

In S250, the processor 110 outputs the print data generated in S240 to the print execution unit 170. In S260 the print execution unit 170 prints the plurality of patch images PB based on the print data received from the processor 110. At this point, the process of FIG. 6(B) and, hence, the process of S140 in FIG. 2 ends.

In S150 of FIG. 2, the colorimeter 200 is used to read the plurality of patch images PB and to generate read data specifying the optical density of each patch image PB. The process of reading the patch images PB with the colorimeter 200 is identical to the process of reading the patch images PA in S120 of FIG. 2. The processor 110 acquires this read data from the colorimeter 200 and analyzes the data to generate the density-related information Gc, Gm, Gy, and Gk.

Figure 8A:
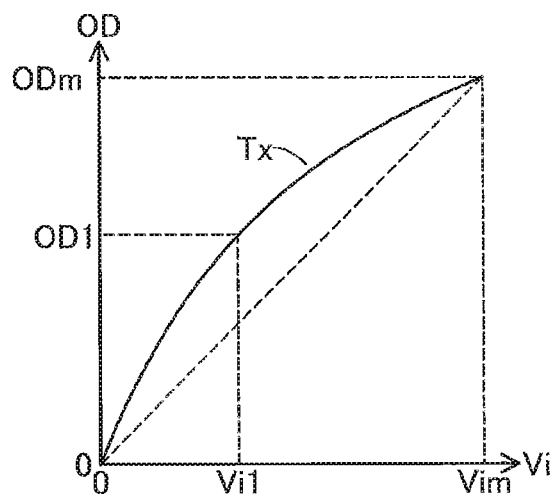
FIG. 8(A) is a graph showing a relationship between gradation values and read optical densities according to the first embodiment.

FIG. 8(A) is a graph showing an example of a relationship between gradation values Vi and read optical densities OD, wherein the horizontal axis represents the gradation value Vi and the vertical axis represents the optical density OD based on the read data. A tone curve Tx in FIG. 8(A) indicates a sample relationship between gradation values Vi of the patch images PB for the same ink color and the optical densities OD. As illustrated in the graph, the optical density OD increases from 0 to a maximum density ODm when the gradation value Vi increases from 0 to the maximum gradation value Vim. However, the relationship between gradation values Vi and optical densities OD is nonlinear. In the example of FIG. 8(A), the tone curve Tx forms a curved line that is convex on the top. The density-related information Gc, Gm, Gy, and Gk is information for correcting the gradation values Vi so that the relationship between gradation values Vi and optical densities OD approaches a linear relationship.

Figure 8B:
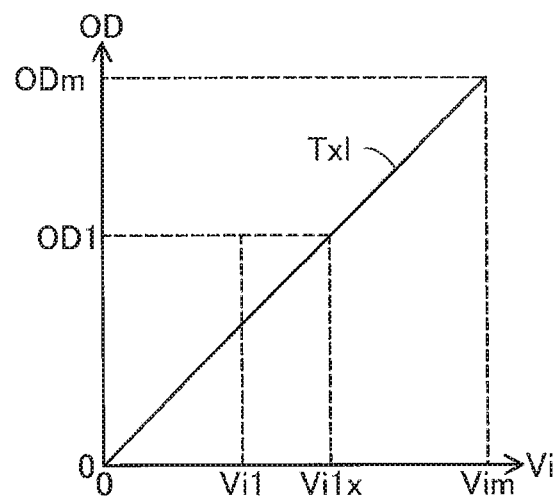
FIG. 8(B) is a graph showing a linear relationship between gradation values and optical densities according to the first embodiment.

FIG. 8(B) is a graph showing a linear relationship Tx1 between gradation values Vi and optical densities OD, wherein the horizontal axis represents the gradation value Vi and the vertical axis represents the optical density OD. The optical density OD is proportional to the gradation value Vi. The optical density OD increases from 0 to the maximum density ODm when the gradation value Vi increases from 0 to the maximum gradation value Vim. A first density OD1 in the graph is the optical density OD corresponding to a first gradation value Vi1 based on the actual tone curve Tx shown in FIG. 8(A). A reference gradation value Vi1x is the gradation value Vi associated with the first density OD1 based on the linear relationship Tx1. As shown in the graph, the reference gradation value Vi1x differs from the first gradation value Vi1.

Figure 8C:
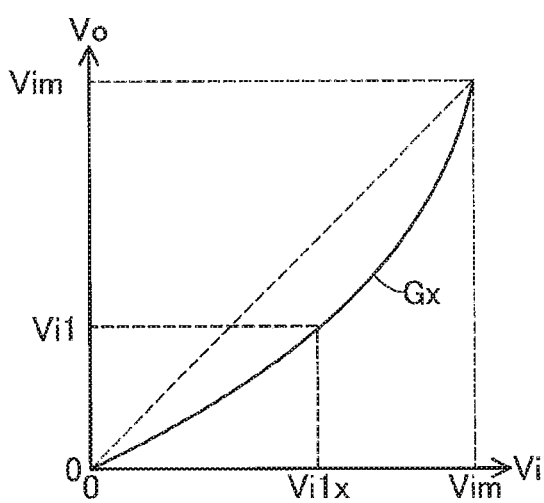
FIG. 8(C) is a graph showing a relationship between pre-corrected gradation values and corrected gradation values according to the first embodiment.

FIG. 8(C) is a graph showing a sample relationship Gx between pre-corrected gradation values Vi (hereinafter called input gradation values Vi) and corrected gradation values Vo (hereinafter called output gradation values Vo), wherein the horizontal axis represents the input gradation value Vi and the vertical axis represents the output gradation value Vo. That is, the relationship Gx shown in FIG. 8(C) is an example of the density-related information. The relationship (or line) Gx in FIG. 8(C) depicts a relationship between the input gradation values Vi and the output gradation values Vo. As shown in the graph, the output gradation value Vo is the first gradation value Vi1 when the input gradation value Vi is the reference gradation value Vi1x. When the input gradation values Vi are corrected based on this relationship Gx, the input gradation value Vi corresponding to the reference gradation value Vi1x is corrected to the first gradation value Vi1, and this corrected first gradation value Vi1 is used in printing. As shown in FIG. 8(A), the optical density OD of the printed color is the first density OD1 for the corrected first gradation value Vi1. That is, the reference gradation value Vi1x is correlated to the optical density OD1 via the relationships Gx and Tx. Accordingly, the linear relationship between the input gradation values Vi and the optical densities OD can be achieved. Thus, the color having a density corresponding to the reference gradation value Vi1x based on the linear relationship Tx1 is printed. By correcting the input gradation values Vi in this way, the relationship between input gradation values Vi and optical densities OD is made to approach the linear relationship Tx1. For other input gradation values Vi, the processor 110 uses the actual tone curve Tx and the linear relationship Tx1 to set a relationship between input gradation values Vi and output gradation values Vo.

The processor 110 sets input gradation values Vi, output gradation values Vo, and the relationship Gx using a plurality of combinations of optical densities OD and input gradation values Vi acquired from the patch images PB for each color of ink. The processor 110 generates the density-related information Gc, Gm, Gy, and Gk specifying the relationship Gx for each color cyan, magenta, yellow, and black and stores this density-related information Gc, Gm, Gy, and Gk in the storage 115 (the nonvolatile storage 130, for example). The density-related information Gc, Gm, Gy, and Gk are one-dimensional lookup tables correlating the input gradation values Vi with the corrected gradation values Vo, for example.

As described above the density-related information Gc, Gm, Gy, and Gk is generated so that the optical density OD changes linearly according to the change in the input gradation value Vi when the input gradation value Vi is converted to the corrected gradation value Vo and the image is printed using the corrected gradation value Vo. In the embodiment each density-related information Gc, Gm, Gy, and Gk is the lookup table correlating the input gradation value Vi with the corrected gradation value Vo as shown in FIG. 8(C). However, the density-related information Gc, Gm, Gy, and Gk may not be the lookup table. For example, each density-related information Gc, Gm, Gy, and Gk may be a function correlating the input gradation value Vi with the corrected gradation value Vo.

As described above, the corrected dot gradation table information 137x is used in the halftone process for printing the patch images PB. Accordingly, the density for each of the patch images PB is approximately the same as the density when the patch images PB are printed by a print execution unit having standard dot ink quantities (i.e., a standard print execution unit). Thus, density-related information Gc, Gm, Gy, and Gk set using these patch images PB specify relationships that are suitable for a standard print execution unit.

In S160 of FIG. 2 the processor 110 controls the print execution unit 170 to print a plurality of color conversion patch images PC using the patch image data PCd for a plurality of color conversion patch images, the corrected dot gradation table information 137x, and the density-related information Gc, Gm, Gy, and Gk.

Figure 9A:
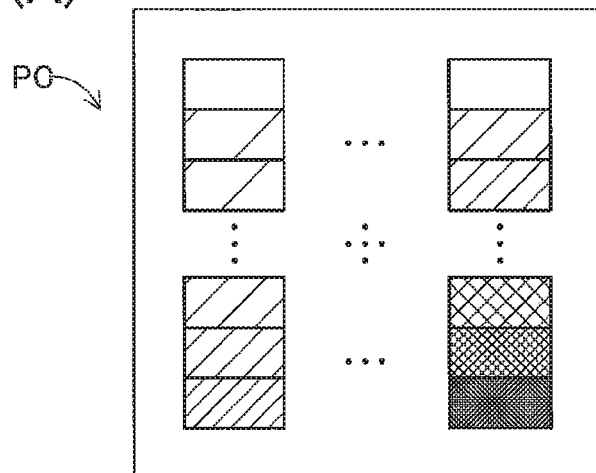
FIG. 9(A) is an explanatory diagram showing a plurality of color conversion patch images according to the first embodiment.

FIG. 9(A) is an explanatory diagram showing an example of a plurality of color conversion patch images PC. The color conversion patch images PC are all images of uniform color, each having a different color from the others. The patch image data PCd specifies colors using color values in the RGB color space (i.e., gradation values for the components R, G, and B). The RGB color values of the color conversion patch images PC are distributed across the entire RGB color space. In the following description, the RGB color values in each color conversion patch image PC will be called grid values.

Figure 9B:
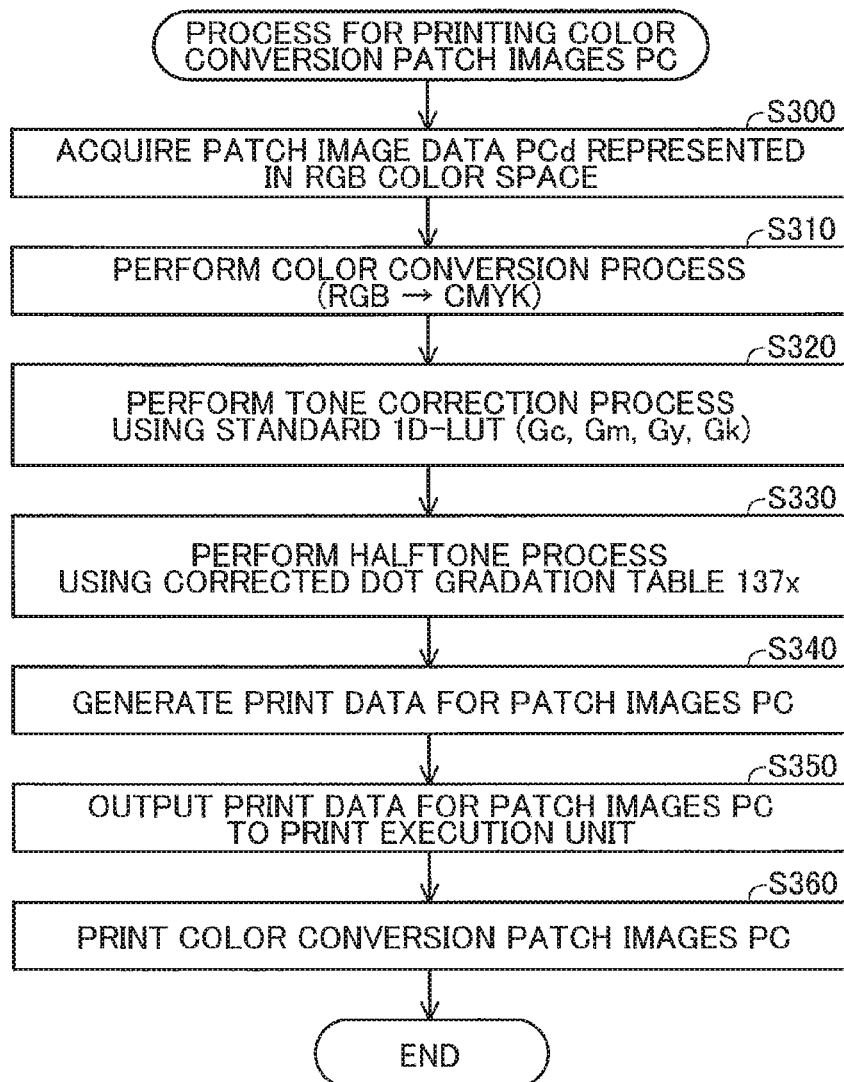
FIG. 9(B) is a flowchart showing a process for printing color conversion patch images according to the first embodiment.

FIG. 9(B) is a flowchart showing a sample process for printing the color conversion patch images PC. In S300 of this process, the processor 110 acquires the patch image data PCd represented in RGB color space. In the embodiment, the processor 110 acquires the patch image data PCd from the nonvolatile storage 130.

In S310 the processor 110 performs a color conversion process on the patch image data PCd. In this color conversion process, RGB color values are converted to CMYK color values (i.e., gradation values for each of C, M, Y, and K). The color conversion process is performed using predetermined relationships between RGB color values and CMYK color values.

In S320 the processor 110 performs tone correction on the CMYK color values using the density-related information Gc, Gm, Gy, and Gk. In S330 the processor 110 performs a halftone process using the tone-corrected CMYK color values and the corrected dot gradation table information 137x. This halftone process is similar to the process described in FIGS. 7(A) and 7(B). Here, the gradation value for each of the tone-corrected CMYK colors is used as the input gradation value Qin.

In S340 the processor 110 generates print data using the results from the halftone process. In S350 the processor 110 outputs the print data generated in S340 to the print execution unit 170. In S360 the print execution unit 170 uses the print data received from the processor 110 to print the color conversion patch images PC. This completes the process of FIG. 9(B) and, hence, the process in S160 of FIG. 2.

Figure 10:
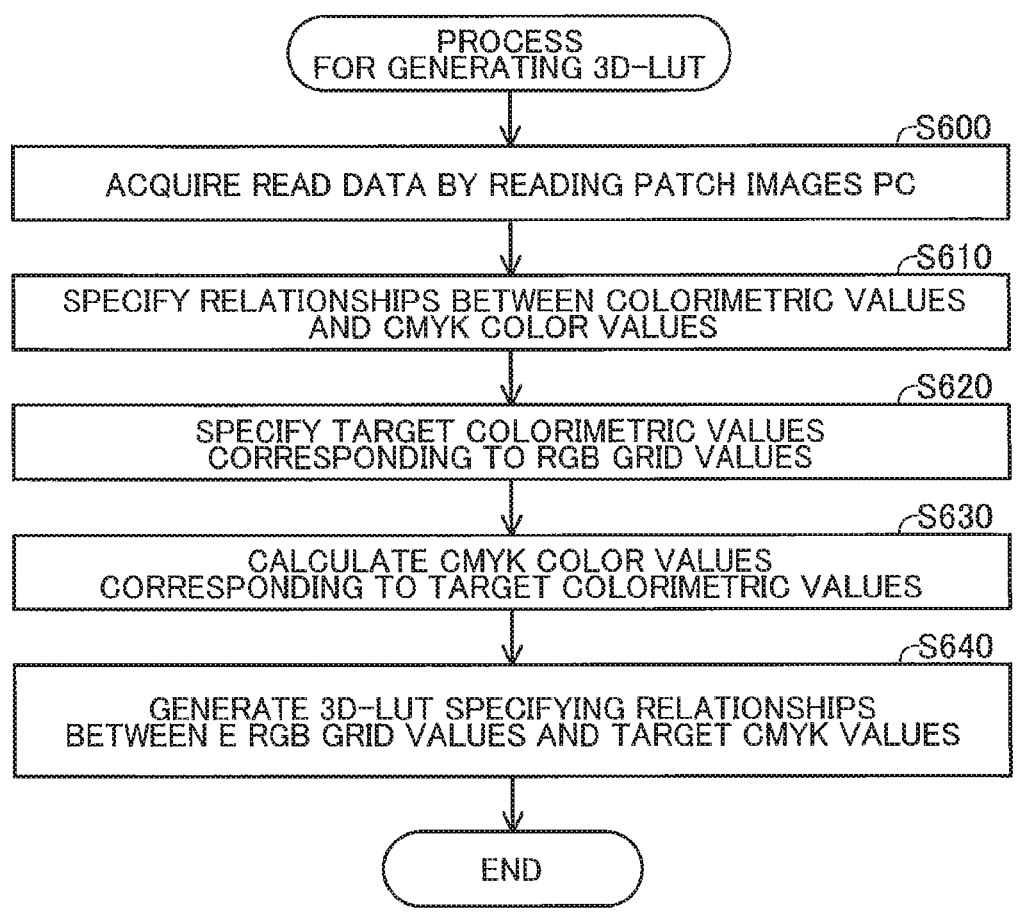
FIG. 10 is a flowchart illustrating a process for generating the color conversion information according to the first embodiment.

In S170 of FIG. 2 the processor 110 acquires read data for the color conversion patch images PC and uses this data to generate the color conversion information 138. FIG. 10 is a flowchart illustrating steps in a sample process for generating the color conversion information 138. In S600 the colorimeter 200 is used to read the color conversion patch images PC and to generate read data specifying a colorimetric value for each color conversion patch image PC. These colorimetric values are represented by color values in a device-independent color space such as the CIELAB color space or the CIEXYZ color space, for example. The process of reading color conversion patch images PC with the colorimeter 200 is performed similarly to the process of reading patch images PA in S120 of FIG. 2. The processor 110 acquires the read data from the colorimeter 200.

In S610 the processor 110 analyzes the read data and identifies relationships between the colorimetric values and the CMYK color values of each color conversion patch image PC. The CMYK color values of the color conversion patch images PC are the values identified through color conversion in S310 of FIG. 9(B). In S620 the processor 110 identifies target colorimetric values corresponding to the RGB color values of the color conversion patch images PC (i.e., the grid values). The RGB color values of color conversion patch images PC are the values specified by the patch image data PCd. Here, predetermined relationships are used as relationships between the RGB color values and target colorimetric values. In S630 the processor 110 calculates the CMYK color values corresponding to the target colorimetric values of each grid value (hereinafter called the target CMYK values). The processor 110 calculates the target CMYK values by interpolating relationships between the CMYK color values identified in S610 and the colorimetric values. In S640 the processor 110 generates the color conversion information 138 specifying a plurality of relationships between the RGB grid values and the target CMYK values by using the relationship between RGB color values and target colorimetric values obtained in S620 and the CMYK values specified in S630, and stores this color conversion information 138 in the storage 115 (the nonvolatile storage 130, for example). The color conversion information 138 is a three-dimensional lookup table correlating the RGB grid values to the CMYK values, for example.

As described above, the corrected dot gradation table information 137x is used in the halftone process for printing the color conversion patch images PC (S330 of FIG. 9(B)). Therefore, the color of each color conversion patch images PC is approximately the same as the color of the color conversion patch images PC printed by a print execution unit having standard dot ink quantities (i.e., a standard print execution unit). Thus, the color conversion information 138 generated based on the color conversion patch images PC specifies relationships suitable for a standard print execution unit.

This completes the process of FIG. 10 and, hence, the process in S170 of FIG. 2. In S180 of FIG. 2 the processor 110 generates the profile data 139, which includes the dot gradation table information 137, the density-related information Gc, Gm, Gy, and Gk, and the color conversion information 138, and stores this profile data 139 in the storage 115 (the nonvolatile storage 130, for example). As will be described later, the profile data 139 is used in a printing process for controlling the print execution unit 170 to print images.

As described above, the profile data 139 includes information 137, 138, and Gc, Gm, Gy, and Gk. So, the storage 115 stores information 137, 138, and Gc, Gm, Gy, and Gk generated and stored in S120, S150, and S170, and also stores the profile data 139. In other words, the information 137, 138, and Gc, Gm, Gy, and Gk stored in S120, S150, and S170 is overlapped with the profile data 139. So, the processor 110 may delete the information 137, 138, and Gc, Gm, Gy, and Gk stored in S120, S150, and S170, and maintain the profile data 139. Further, the CPU 110 may delete the corrected dot gradation table 137x.

A3. Printing Process

Figure 11:
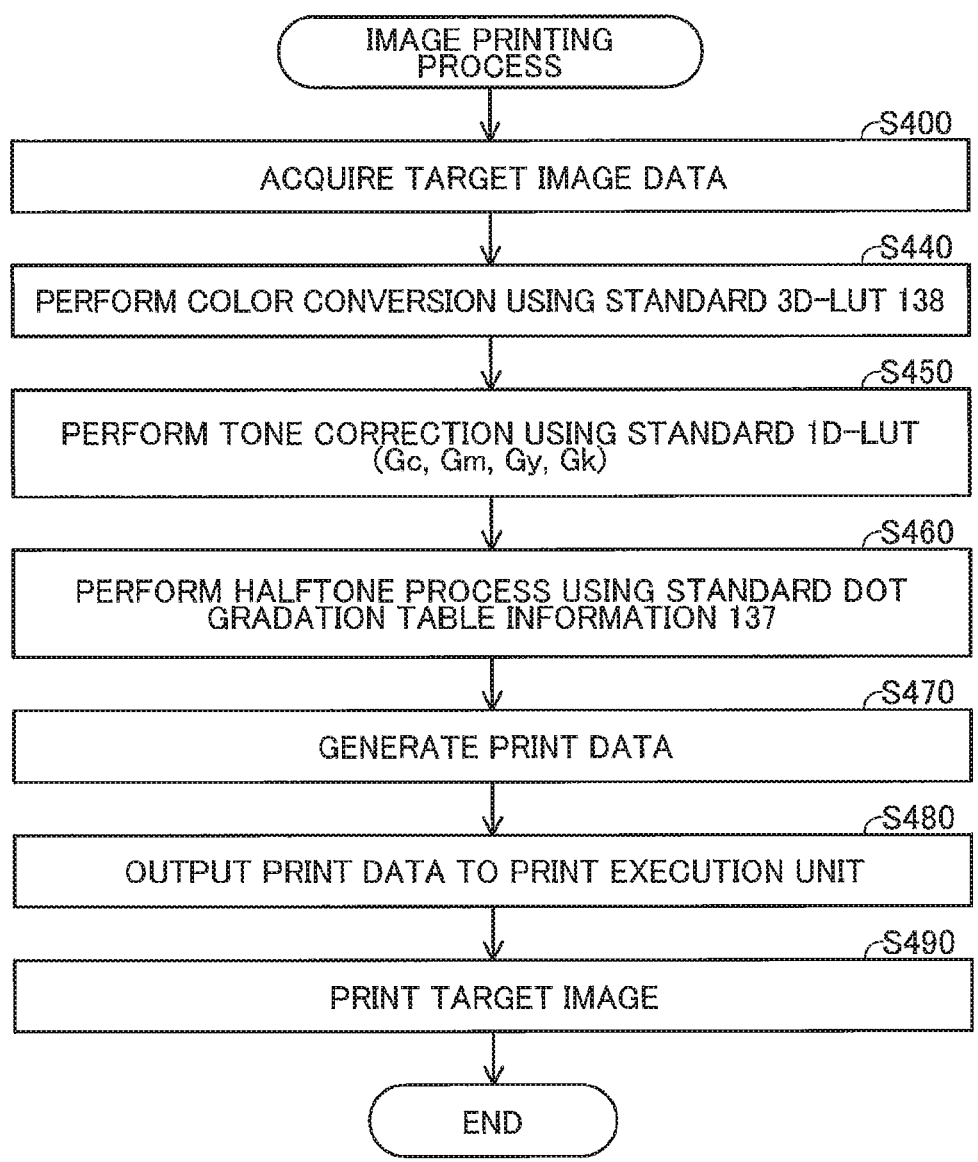
FIG. 11 is a flowchart illustrating an image printing process according to the first embodiment.

FIG. 11 is a flowchart illustrating steps in an image printing process. The processor 110 starts the process in FIG. 11 by executing the second program 132 in response to a user command inputted into the operation interface 150.

In S400 the processor 110 acquires image data to be printed (hereinafter called "target image data"). The target image data acquired by the processor 110 may be image data specified in a print start command received from the user or an application program, for example. In the embodiment, the target image data is bitmap data, and the pixel value of each pixel in the target image data is expressed by RGB gradation values having one of 256 levels from 0 to 255. If the specified image data is in a format other than the bitmap format (the Enhanced Metafile (EMF) format, for example), the processor 110 converts (rasterizes, for example) the image data to generate bitmap data for use as the target image data. Further, if the pixel density in the image data differs from a prescribed pixel density for the printing process, the processor 110 performs a process to convert the pixel density of the image data to the pixel density for the printing process.

In S440 the processor 110 converts the values of each pixel in the target image data from RGB gradation values to CMYK gradation values corresponding to the color components of colorant used in printing. Relationships between RGB values and CMYK values are predefined by the color conversion information 138 included in the profile data 139. The processor 110 executes the color conversion process while referencing the color conversion information 138. In S450 the processor 110 performs tone correction on the CMYK color values using the density-related information Gc, Gm, Gy, and Gk included in the profile data 139.

In S460 the processor 110 performs a halftone process using the tone-corrected CMYK color values and the dot gradation table information 137 included in the profile data 139. This halftone process is similar to the process described in FIGS. 7(A) and 7(B). Here, the tone-corrected CMYK gradation values are each used individually as the input gradation value Qin. Further, the dot gradation values specified in the dot gradation table information 137 are used as the dot gradation values in place of those specified in the corrected dot gradation table information 137x. However, the corrected dot gradation table information 137x generated in S130 (FIG. 2) may be used in S460. In this case, the deviation in actual ink usage from the standard ink usage can be suppressed in the printing process.

In S470 the processor 110 generates print data based on the results of the halftone process. In S480 the processor 110 outputs the print data generated in S470 to the print execution unit 170. In S490 the print execution unit 170 prints an image based on the print data received in S480, thereby printing an image specified by the target image data. This completes the printing process of FIG. 11.

The information 137, Gc, Gm, Gy, Gk, and 138 included in the profile data 139 are generated using a particular print execution unit 170. As described above, the effects of ink quantity differences (i.e., differences between actual ink usage and standard ink usage) inherent in the particular print execution unit 170 on the information 137, Gc, Gm, Gy, Gk, and 138 are mitigated. In the embodiment, the profile data 139 suited to the standard print execution unit is generated even when the ink quantity differences specific to the particular print execution unit 170 are large. Hence, the profile data 139 is suitable for printing processes performed on other print execution units 170 of the same model and is not limited to printing processes performed on the particular print execution unit 170. In this way, the profile data 139 may be stored in a storage device of a multifunction peripheral separate from the MFP 100 possessing the particular print execution unit 170. In this case, the other multifunction peripheral may execute the printing process of FIG. 11 while referencing the profile data 139. Thus, the profile data 139 may be used universally in printing processes for a plurality of print execution units having the same model as the print execution unit 170.

In the embodiment described above, the processor 110 acquires the offset information 134 in S100 of FIG. 2 that specifies deviations in usage of colorants by the print execution unit 170 from a standard usage common to a plurality of print execution units. In S110 the processor 110 controls the print execution unit 170 to print the patch images PA using the patch image data PAd specifying the patch images PA without using the offset information 134 (i.e., the calibration values Cc, Cm, Cy, and Ck). In S120 the processor 110 uses read data obtained by optically reading the patch images PA to generate the dot gradation table information 137 to be used universally in printing processes performed by a plurality of print execution units having the same model as the print execution unit 170. In S130 the processor 110 corrects the dot gradation table information 137 using the offset information 134 (and specifically the calibration values Cc, Cm, Cy, and Ck) to generate the corrected dot gradation table information 137x for the particular print execution unit 170. In S160 the processor 110 controls the particular print execution unit 170 to print the color conversion patch images PC using the corrected dot gradation table information 137x. In S170 the processor 110 uses the read data obtained by optically reading the color conversion patch images PC to generate the color conversion information 138 to be used universally in printing processes performed by a plurality of print execution units.

Thus, the processor 110 uses the offset information 134 to correct the dot gradation table information 137 that was generated without the offset information 134, producing the corrected dot gradation table information 137x for the particular print execution unit 170. Subsequently, the processor 110 uses this corrected dot gradation table information 137x to generate the color conversion information 138 for universal use in printing processes performed by a plurality of print execution units. As a result, the processor 110 can use this particular print execution unit 170 to generate suitable color conversion information 138 for universal use in printing processes performed by a plurality of print execution units, even when the usage of colorants by the particular print execution unit 170 deviates from the standard usage.

Further, the dot gradation value table information 137 and 137x generated in S120 and S130 of FIG. 2 is used in the halftone process (a process based on the error diffusion method in this example). Further, the color conversion information 138 generated in S170 is used in the color conversion process. Thereafter in S160 of FIG. 2 (and specifically in S330 and S340 of FIG. 9(B)), the processor 110 executes a halftone process using the corrected dot gradation table information 137x to generate print data for the color conversion patch images PC. In S350 of FIG. 9(B), the processor 110 outputs this print data to the particular print execution unit 170, controlling the particular print execution unit 170 to print the color conversion patch images PC. Here, the print execution unit 170 can suitably print the color conversion patch images PC since the print data for the color conversion patch images PC was generated through a halftone process performed using the corrected dot gradation table information 137x. As a result, the processor 110 can generate appropriately the color conversion information 138.

In S140 of FIG. 2 the processor 110 controls the particular print execution unit 170 to print the patch images PB using the corrected dot gradation table information 137x. In S150 the processor 110 uses read data acquired by optically reading the patch images PB to generate the density-related information Gc, Gm, Gy, and Gk for universal use in printing processes executed by a plurality of print execution units. In S160 of FIG. 2 (and specifically in S320 and S330 of FIG. 9(B)), the processor 110 controls the particular print execution unit 170 to print the color conversion patch images PC using the corrected dot gradation table information 137x and the density-related information Gc, Gm, Gy, and Gk. In this way, the particular print execution unit 170 can print suitable color conversion patch images PC using the corrected dot gradation table information 137x and the density-related information Gc, Gm, Gy, and Gk acquired using the corrected dot gradation table information 137x. As a result, the processor 110 can generate suitably the color conversion information 138.

The density-related information Gc, Gm, Gy, and Gk generated in S150 of FIG. 2 is used in the tone-correction process. In the process of generating the density-related information Gc, Gm, Gy, and Gk (S150 of FIG. 2), the corrected dot gradation table information 137x is used as described in S230 of FIG. 6(B). As a result, the processor 110 can generate suitably the density-related information Gc, Gm, Gy, and Gk.

B. Second Embodiment

B1. Process for Generating Print Data

Figure 12:
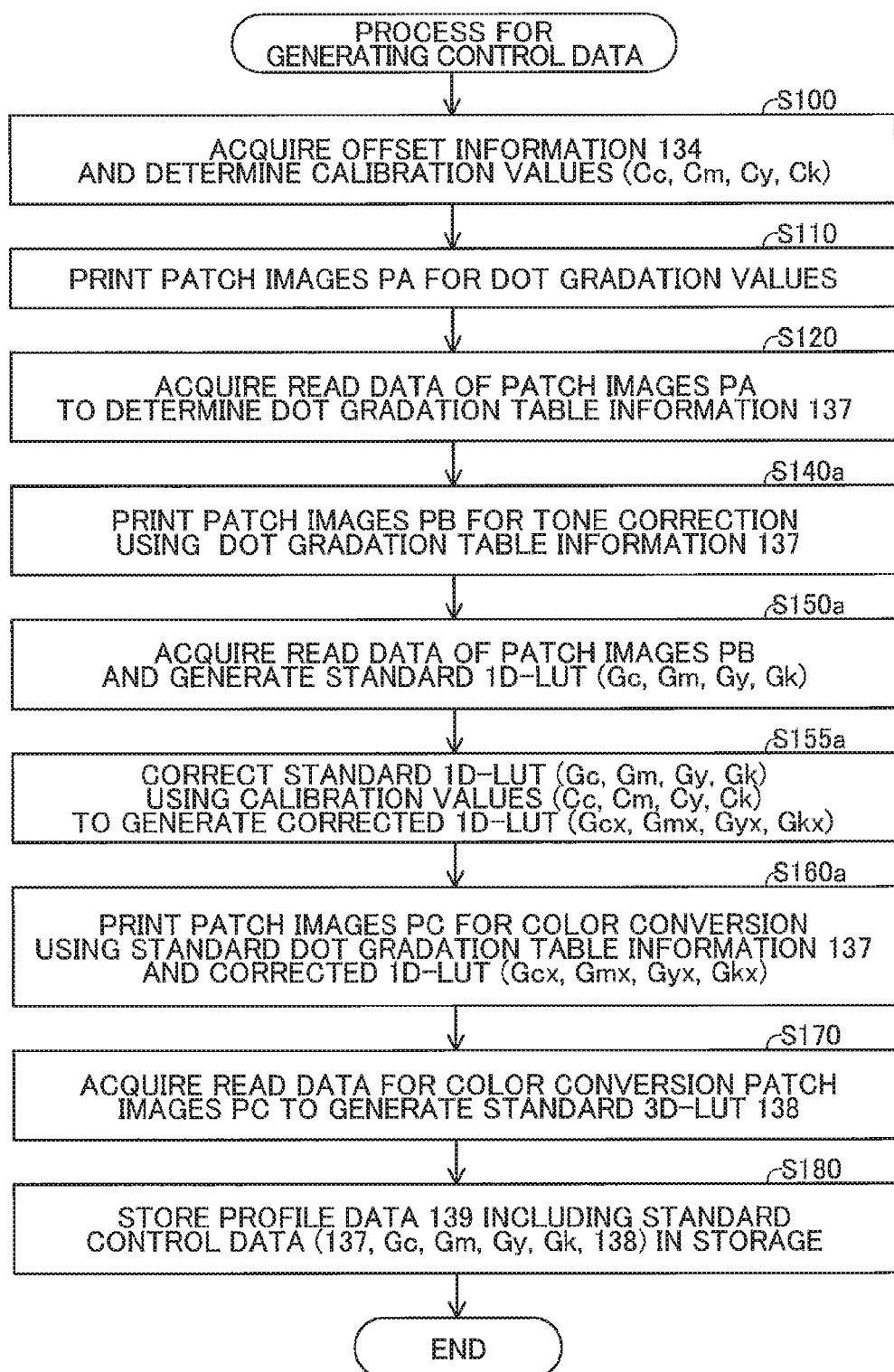
FIG. 12 is a flowchart illustrating a process for generating control data according to a second embodiment.

FIG. 12 is a flowchart showing steps in the process for generating control data according to a second embodiment. In the second embodiment, steps S130, S140, S150, and S160 in the process of FIG. 2 are replaced with steps S140a, S150a, S155a, and S160a. All other steps in the flowchart of FIG. 12 are identical to the corresponding steps in the flowchart of FIG. 2, and the same step numbers have been used to avoid duplicating description. As in the first embodiment, the MFP 100 shown in FIG. 1 is also used in the second embodiment.

As in the first embodiment described in FIG. 2, the processor 110 in the second embodiment generates the profile data 139 (i.e., the information 137, Gc, Gm, Gy, Gk, and 138) suitable for a standard print execution unit. However, unlike in the first embodiment, the processor 110 in the second embodiment corrects the density-related information Gc, Gm, Gy, and Gk using the offset information 134 (and specifically the calibration values Cc, Cm, Cy, and Ck) rather than correcting the dot gradation table information 137.

Steps S100-S120 of FIG. 12 are identical to the same steps in FIG. 2. In S140a the processor 110 controls the print execution unit 170 to print a plurality of tone correction patch images using the patch image data PBd and the dot gradation table information 137. The plurality of tone correction patch images are identical to the patch images PB in FIG. 6(A) (hereinafter, these patch images will be called the patch images PB).

Figure 13:
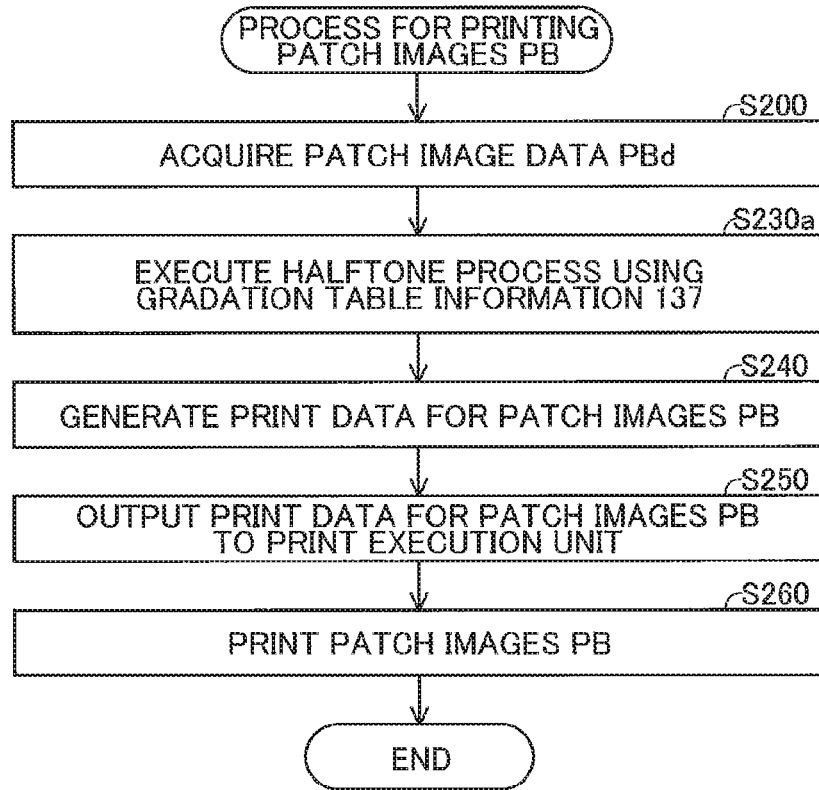
FIG. 13 is flowchart illustrating a process for printing patch images according to the second embodiment.

FIG. 13 is flowchart illustrating steps in a process for printing patch images PB. The process in FIG. 13 differs from the process of the first embodiment shown in FIG. 6(B) only in that step S230 has been replaced with step S230a. All other steps in the flowchart of FIG. 13 are identical to the corresponding steps in the flowchart of FIG. 6(B). In S230a the processor 110 executes a halftone process on the patch image data PBd while referencing the dot gradation table information 137. In the process of FIG. 13, the processor 110 does not use the corrected dot gradation table information 137x that was used in the process of FIG. 6(B). Hence, the densities of the printed patch images PB will be affected by ink quantity differences inherent in the print execution unit 170.

In S150a of FIG. 12, the colorimeter 200 is used to read the patch images PB and generate read data specifying the optical densities of the patch images PB. The process of reading patch images PB with the colorimeter 200 is identical to the process in S150 of FIG. 2. The processor 110 acquires this read data from the colorimeter 200 and analyzes the read data to generate the density-related information Gc, Gm, Gy, and Gk.

Figure 14:
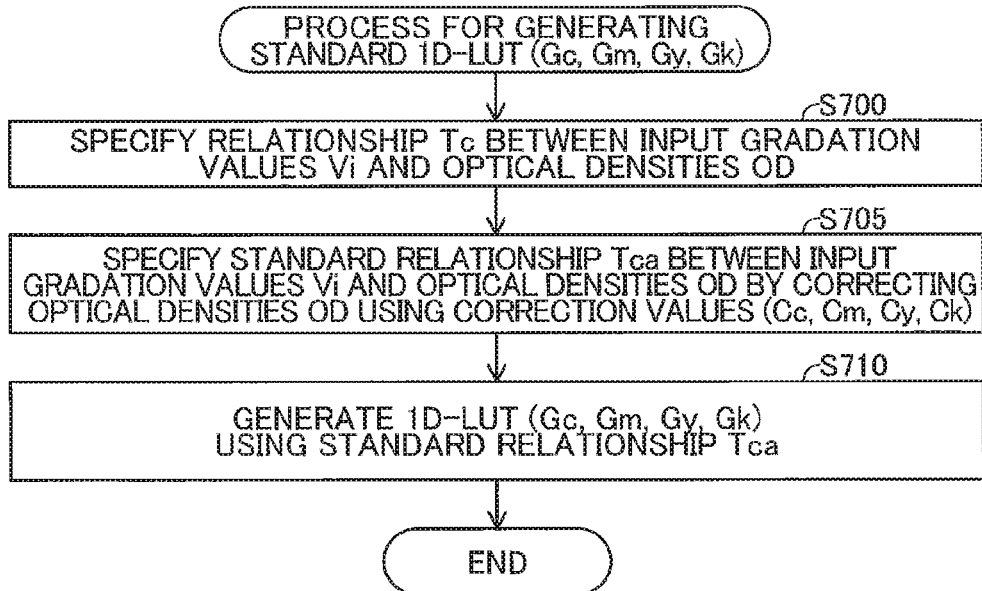
FIG. 14 is a flowchart illustrating a process for generating density-related information according to the second embodiment.

FIG. 14 is a flowchart illustrating steps in a process for generating the density-related information Gc, Gm, Gy, and Gk. In S700 of FIG. 14, the processor 110 analyzes the read data and identifies relationships between input gradation values Vi specified by the patch image data PBd and optical densities OD.

Figure 15A:
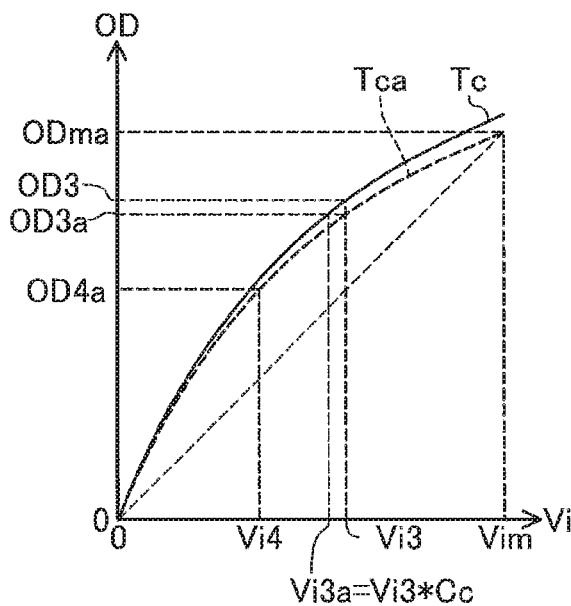
FIG. 15(A) is a graph showing relationships between input gradation values and optical densities according to the second embodiment.

FIG. 15(A) is a graph showing a sample relationship between input gradation values Vi and optical densities OD based on the read data, where the horizontal axis represents the input gradation value Vi and the vertical axis represents the optical density OD. As with the tone curve Tx in FIG. 8(A), a tone curve Tc in FIG. 15(A) denotes a sample relationship between input gradation values Vi of the patch images PB and optical densities OD for the same ink color. More specifically, the tone curve Tc will specify a tone curve for cyan ink in this example.

In S705 of FIG. 14, the processor 110 uses the identified relationship (the tone curve Tc, for example) to determine a standard relationship between input gradation values Vi and optical densities OD. As described above, the densities of patch images PB are affected by ink quantity differences inherent in the print execution unit 170 in the second embodiment. In this example, it is assumed that the actual ink usage of cyan ink is greater than the standard ink usage (i.e., the cyan calibration value Cc is smaller than 1). In this case, the optical density OD of each patch image PB is higher than the optical density OD of the same patch image PB printed based on standard ink usage. A standard tone curve Tca shown in FIG. 15(A) is the curve obtained when the actual ink usage of cyan ink is equivalent to the standard ink usage. As illustrated in the graph, the optical density OD specified by the standard tone curve Tca is lower than the optical density OD specified by the actual tone curve Tc. In S705 of FIG. 14, the processor 110 identifies the standard tone curve Tca through interpolation of optical densities OD for the actual tone curve Tc, as described below.

In FIG. 15(A), a third gradation value Vi3 and a third density OD3 specify a combination of input gradation value Vi and optical density OD for a single patch image PB. Since the actual ink usage is greater than the standard ink usage for cyan ink in this example, the third density OD3 is higher than a reference optical density OD3a, which is the optical density OD corresponding to the third gradation value Vi3 according to the standard tone curve Tca. When the actual ink usage is equivalent to the standard ink usage, the optical density OD of the patch image PB corresponding to the third gradation value Vi3 is equivalent to the reference optical density OD3a, which is correlated by the actual tone curve Tc with a reference gradation value Vi3a smaller than the third gradation value Vi3. As described above, the cyan calibration value Cc determined in S100 of FIG. 12 is an index related to the ratio of the standard ink usage to the actual ink usage. The reference gradation value Vi3a is calculated by multiplying the third gradation value Vi3 by the cyan calibration value Cc. The reference optical density OD3a correlated with the reference gradation value Vi3a by the actual tone curve Tc is calculated by interpolating a plurality of combinations of input gradation values Vi and optical densities OD for the plurality of patch images PB forming the tone curve Tc. The processor 110 calculates optical densities OD corresponding to various input gradation values Vi through interpolation in the same way that the reference optical density OD3a corresponding to the third gradation value Vi3 was found through interpolation. In this way, the processor 110 can identify the standard tone curve Tca. Thus, by correcting the optical density OD specified in the read data using the cyan calibration value Cc, the processor 110 can identify a relationship between the input gradation values Vi and the corrected optical densities OD, i.e., the standard tone curve Tca. When the gradation value Vi increases from 0 to the maximum gradation value Vim, the optical density OD specified by the standard tone curve Tca increases from 0 to a maximum density ODma. The processor 110 similarly identifies standard tone curves for the color components other than cyan.

In S710 of FIG. 14, the processor 110 generates the density-related information Gc, Gm, Gy, and Gk using the corrected optical densities OD (i.e., the standard tone curve Tca). The process for generating the density-related information Gc, Gm, Gy, and Gk is identical to that of the first embodiment described in FIGS. 8(A)-8(C).

Figure 15B:
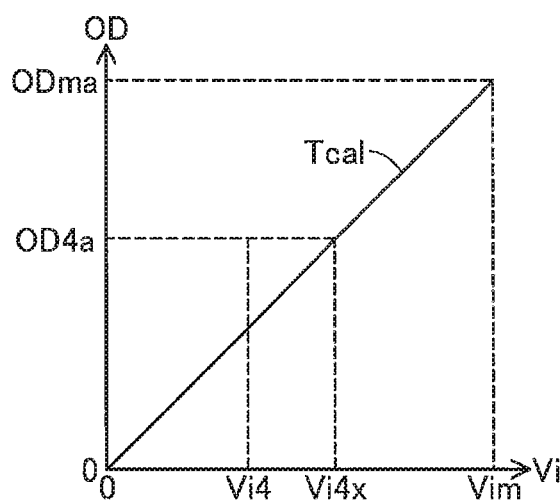
FIG. 15(B) is a graph showing a linear relationship between the input gradation values and optical densities according to the second embodiment.

FIG. 15(B) is a graph showing a linear relationship Tcal between the input gradation values Vi and optical densities OD, where the horizontal axis represents the gradation value Vi and the vertical axis represents the optical density OD. A fourth density OD4a denotes the optical density OD associated with a fourth gradation value Vi4 based on the standard tone curve Tca shown in FIG. 15(A). A reference gradation value Vi4x denotes the gradation value Vi associated with the fourth density OD4a based on the linear relationship Tcal.

Figure 15C:
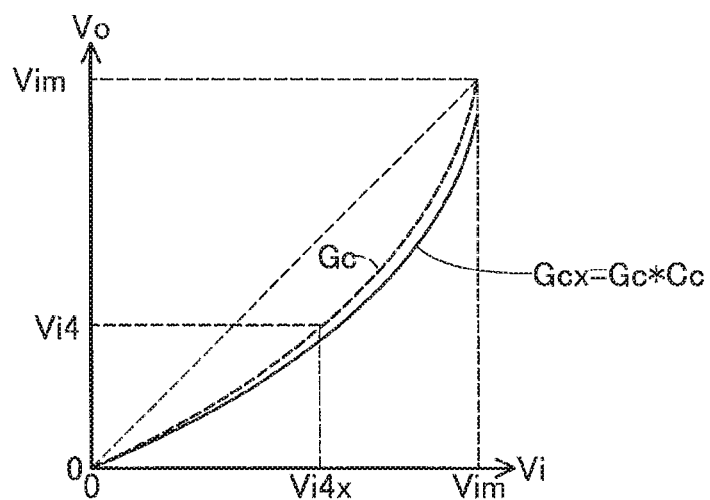
FIG. 15(C) is a graph showing relationships between pre-corrected input gradation values and post-corrected output gradation values according to the second embodiment.

FIG. 15(C) is a graph showing relationships between pre-corrected input gradation values Vi and post-corrected output gradation values Vo, wherein the horizontal axis represents the gradation value Vi and the vertical axis represents the output gradation value Vo. The line Gc in FIG. 15(C) denotes the relationship between input gradation values Vi and output gradation values Vo specified by the density-related information Gc. When the gradation value Vi is the reference gradation value Vi4x, the output gradation value Vo is the fourth gradation value Vi4, as shown in the density-related information Gc. When the gradation value Vi is corrected according to the relationship Gc, the gradation value Vi is corrected from the reference gradation value Vi4x to the fourth gradation value Vi4, and printing is performed based on the corrected fourth gradation value Vi4. When an image is printed based on the standard tone curve Tca shown in FIG. 15(A), i.e., when the actual ink usage is equivalent to the standard ink usage, the optical density OD of the printed color is the fourth density OD4a for the corrected gradation value Vi4. Thus, the color is printed at a density corresponding to the linear relationship Tcal (FIG. 15(B)). For other input gradation values Vi, the processor 110 can set relationships between the input gradation values Vi and output gradation values Vo using the standard tone curve Tca and the linear relationship Tcal. Through this process, the processor 110 generates the density-related information Gc.

The above description considers the case in which the calibration value Cc is smaller than 1. However, the processor 110 can generate the density-related information Gc according to the same method when the calibration value Cc is greater than 1. The processor 110 similarly generates the density-related information Gm, Gy, and Gk for the other ink colors in the process of FIG. 14. Subsequently, the processor 110 stores the density-related information Gc, Gm, Gy, and Gk in the storage 115 (the nonvolatile storage 130, for example). This completes the process of FIG. 14 and, hence, the process in S150a of FIG. 12.

In S155a of FIG. 12, the processor 110 corrects the density-related information Gc, Gm, Gy, and Gk using the calibration values Cc, Cm, Cy, and Ck to produce the corrected density-related information Gcx, Gmx, Gyx, and Gkx. FIG. 15(C) shows an example of the corrected density-related information Gcx generated from the standard density-related information Gc. The corrected density-related information Gcx is found by multiplying the output gradation values Vo of the standard density-related information Gc by the calibration value Cc. A similar process is performed to find the corrected density-related information Gmx, Gyx, and Gkx for the other ink colors. The processor 110 stores the corrected density-related information Gcx, Gmx, Gyx, and Gkx in the storage 115 (the nonvolatile storage 130, for example).

When the actual ink usage is greater than the standard ink usage, i.e., when the calibration value Cc is smaller than 1, the output gradation value Vo specified by the corrected density-related information Gcx is smaller than the output gradation value Vo specified by the density-related information Gc, as illustrated in FIG. 15(C). Since tone correction performed based on the corrected density-related information Gcx reduces the quantity of ink used in printing, this tone correction can bring the printed color close to the color printed on a standard print execution unit. Conversely, when the actual ink usage is less than the standard ink usage (i.e., when the calibration value Cc is greater than 1), the output gradation value Vo specified by the corrected density-related information Gcx is greater than the output gradation value Vo specified by the density-related information Gc. Hence, tone correction using the corrected density-related information Gcx increases the quantity of ink used for printing, thereby bringing the printed color closer to the color printed by a standard print execution unit.

In S160a of FIG. 12, the processor 110 controls the print execution unit 170 to print a plurality of color conversion patch images PC using the patch image data PCd, the dot gradation table information 137, and the corrected density-related information Gcx, Gmx, Gyx, and Gkx. The plurality of color conversion patch images PC printed on the print execution unit 170 is identical to the color conversion patch images PC in FIG. 9(A) (hereinafter, these patch images will be called the "color conversion patch images PC").

Figure 16:
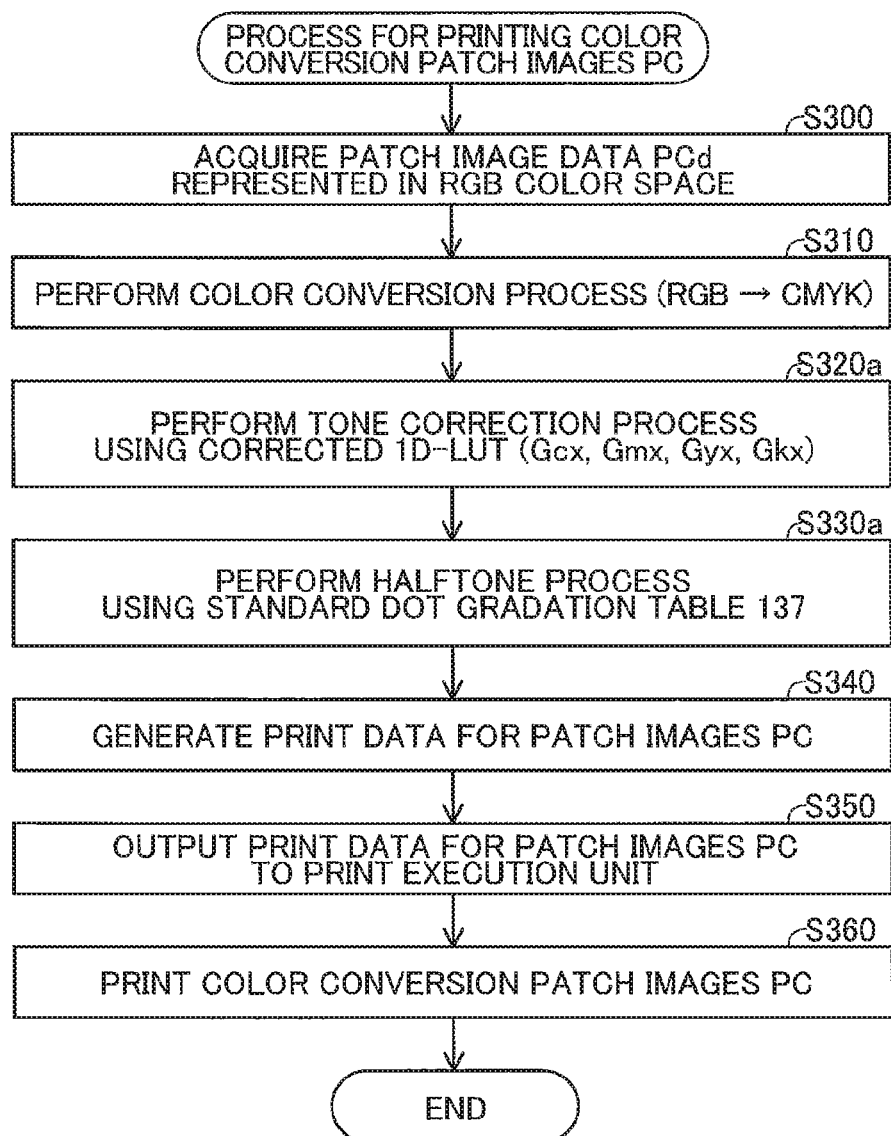
FIG. 16 is a flowchart illustrating a process for printing color conversion patch images according to the second embodiment.

FIG. 16 is a flowchart illustrating steps in a process for printing the color conversion patch images PC. This process differs from the first embodiment shown in FIG. 9(B) in that steps S320 and S330 of FIG. 9(B) are replaced with steps S320a and S330a. All other steps in the flowchart of FIG. 16 are identical to the corresponding steps in the flowchart of FIG. 9(B). In S320a the processor 110 performs tone correction on the CMYK color values using the corrected density-related information Gcx, Gmx, Gyx, and Gkx. In S330a the processor 110 performs a halftone process using the tone-corrected CMYK color values and the dot gradation table information 137. Thus, in the process of FIG. 16 according to the second embodiment, the processor 110 does not use the corrected dot gradation table information 137x, unlike the process in FIG. 9(B). Instead, the processor 110 uses the corrected density-related information Gcx, Gmx, Gyx, and Gkx. Consequently, the color of each patch image PC is approximately equivalent to the color of the patch image PC printed on a standard print execution unit.

S170 and S180 of FIG. 12 are identical to the same steps in FIG. 2. Hence, just as in the process of FIG. 2 according to the first embodiment, the processor 110 generates the color conversion information 138 and subsequently generates the profile data 139 that includes the standard information 137, Gc, Gm, Gy, Gk, and 138.

In the second embodiment described above, in S140a of FIG. 12 the processor 110 controls the particular print execution unit 170 to print the tone correction patch images PB using the patch image data PBd for tone correction patch images PB, and not using the offset information 134 (i.e., the calibration values Cc, Cm, Cy, and Ck). In S150a the processor 110 uses read data acquired by optically reading the tone correction patch images PB to generate the density-related information Gc, Gm, Gy, and Gk that are to be used universally in printing processes performed on a plurality of print execution units having the same model as the print execution unit 170. In S155a the processor 110 generates the corrected density-related information Gcx, Gmx, Gyx, and Gkx for the particular print execution unit 170 by correcting the density-related information Gc, Gm, Gy, and Gk using the offset information 134 (i.e., the calibration values Cc, Cm, Cy, and Ck). In S155a the processor 110 stores the corrected density-related information Gcx, Gmx, Gyx, and Gkx in the storage 115. In S160a the processor 110 controls the particular print execution unit 170 to print the color conversion patch images PC using the corrected density-related information Gcx, Gmx, Gyx, and Gkx. In S170 the processor 110 uses read data acquired by optically reading the color conversion patch images PC to generate the color conversion information 138 for universal use in printing processes to be performed by a plurality of print execution units.

The processor 110 may delete the corrected density-related information Gcx, Gmx, Gyx, and Gkx stored in S155a from the storage 115.

Thus, the processor 110 uses the offset information 134 to correct the density-related information Gc, Gm, Gy, and Gk generated while removing influence of deviation in colorant usage from the standard usage in order to generate the corrected density-related information Gcx, Gmx, Gyx, and Gkx for the particular print execution unit 170. Next, the processor 110 generates the color conversion information 138 for universal use in printing processes performed on a plurality of print execution units using the corrected density-related information Gcx, Gmx, Gyx, and Gkx. As a result, the processor 110 can use the particular print execution unit 170 to generate suitable color conversion information 138 for common use in printing processes performed on a plurality of print execution units, even when the usage of colorants by the particular print execution unit 170 deviates from the standard usage.

In S150a of FIG. 12, and specifically in S700 of FIG. 14, the processor 110 identifies the tone curve Tc defining a relationship between the input gradation values Vi specified by the patch image data PBd and the optical densities OD represented by color values in the read data, as illustrated in FIG. 15(A). In S705 the processor 110 uses this tone curve Tc to identify a corresponding standard optical density OD and standard gradation value Vi (for example, the reference optical density OD3a and reference gradation value Vi3 in FIG. 15(A)) as indicated by the standard tone curve Tca. In S710 the processor 110 uses the standard tone curve Tca to generate the density-related information Gc, Gm, Gy, and Gk. In this way, the standard tone curve Tca identified using the tone curve Tc can in turn be used to generate suitable density-related information Gc, Gm, Gy, and Gk.

The density-related information Gc, Gm, Gy, and Gk generated in S150a of FIG. 12 is information used in the tone correction process. The color conversion information 138 generated in S170 of FIG. 12 is information used in the color conversion process. Subsequently, in S160a of FIG. 12, and specifically in S320a-S340 of FIG. 16, the processor 110 executes a tone correction process using the corrected density-related information Gcx, Gmx, Gyx, and Gkx to generate print data for the color conversion patch images PC. In S350 of FIG. 16, the processor 110 controls the particular print execution unit 170 to print the color conversion patch images PC by outputting the print data to the print execution unit 170. Since the processor 110 generates the print data for the color conversion patch images PC by executing the tone correction process using the corrected density-related information Gcx, Gmx, Gyx, and Gkx in this way, the processor 110 can print suitable color conversion patch images PC and, hence, can generate suitable color conversion information 138.

In S110 of FIG. 12, the processor 110 controls the particular print execution unit 170 to print patch images PA using the patch image data PAd for the patch images PA and not using the offset information 134 (i.e., the calibration values Cc, Cm, Cy, and Ck). In S120 of FIG. 12, the processor 110 uses read data acquired by optically reading the patch images PA to generate the dot gradation table information 137 for universal use in printing processes performed on a plurality of print execution units. In S140a of FIG. 12, the processor 110 controls the particular print execution unit 170 to print tone correction patch images PB using the patch image data PBd and the dot gradation table information 137. In S160a the processor 110 generates print data for the color conversion patch images PC using the corrected density-related information Gcx, Gmx, Gyx, and Gkx and the dot gradation table information 137, as described in S320a-S340 of FIG. 16. Accordingly, the print execution unit 170 can suitably print the color conversion patch images PC since the print data for the color conversion patch images PC was generated using the corrected density-related information Gcx, Gmx, Gyx, and Gkx and the dot gradation table information 137. As a result, the processor 110 can generate the suitable color conversion information 138.

The dot gradation table information 137 generated in S120 of FIG. 12 is data used in the halftone process. In S160a of FIG. 12, and specifically in S320a-S340 of FIG. 16, the processor 110 executes a tone correction process using the corrected density-related information Gcx, Gmx, Gyx, and Gkx and executes a halftone process using the dot gradation table information 137 to generate print data for the color conversion patch images PC. Accordingly, the print execution unit 170 can suitably print the color conversion patch images PC since the print data for the color conversion patch images PC was generated through a tone correction process performed using the corrected density-related information Gcx, Gmx, Gyx, and Gkx and a halftone process performed using the dot gradation table information 137. As a result, the processor 110 can generate the suitable color conversion information 138.

C. Another Embodiment of the Printing Process

Figure 17:
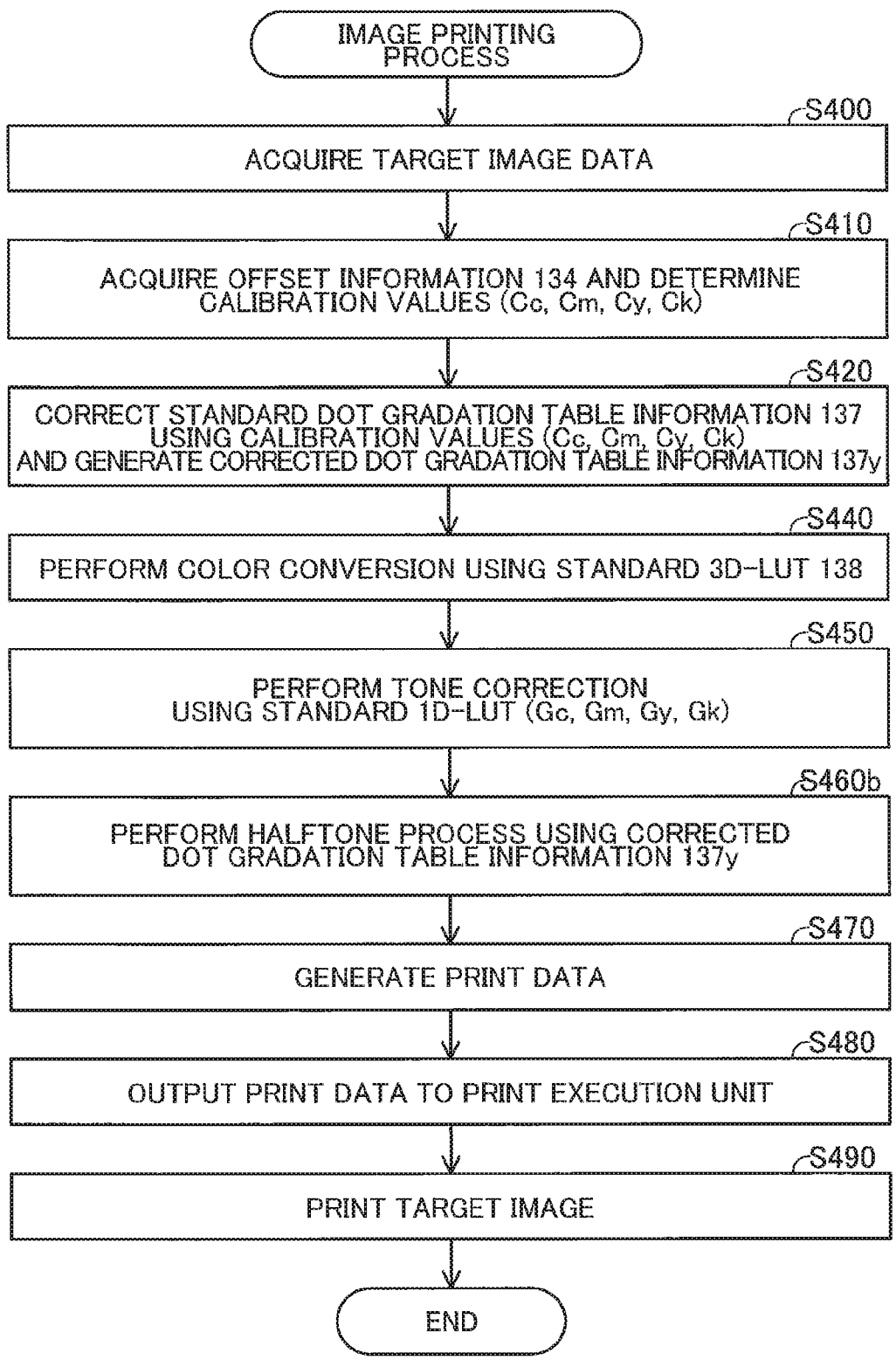
FIG. 17 is a flowchart illustrating a printing process according to another embodiment.

FIG. 17 is a flowchart illustrating steps in a printing process according to another embodiment. The printing process in FIG. 17 differs from the process in FIG. 11 according to the first embodiment in that steps S410 and S420 have been added between steps S400 and S440 and step S460 has been replaced with step S460b. All other steps in the flowchart of FIG. 17 are identical to the corresponding to the steps in the flowchart of FIG. 11. S410 in FIG. 17 is identical to S100 in FIG. 2. In S420, the processor 110 corrects the dot gradation table information 137 using the calibration values Cc, Cm, Cy, and Ck obtained in S410 to generate the corrected dot gradation table information 137y. The corrected dot gradation table information 137y is generated in a similar manner illustrated in S130 with reference to FIGS. 2 and 5. That is, the corrected dot gradation values are set by dividing the dot gradation values specified by the dot gradation table information 137 by the corresponding ink calibration values. Because the profile data 139 is stored in the storage 115 when starting the printing process shown in FIG. 18, in S420 the processor 110 corrects the gradation table information 137 included in the profile data 139 stored in the storage 115 to generate the corrected dot gradation table 137y. In S460b the processor 110 performs a halftone process using the tone-corrected CMYK color values and the corrected dot gradation table information 137y. Thus, the processor 110 performs the halftone process using the corrected dot gradation table information 137y in place of the dot gradation table information 137 in the printing process of FIG. 17. Accordingly, the processor 110 can bring the printed colors closer to the colors printed by a standard print execution unit.

FIG. 18 is a flowchart illustrating steps in a printing process according to still another embodiment. The printing process in FIG. 18 differs from the printing process according to the first embodiment shown in FIG. 11 in that steps S410 and S430 have been added between steps S400 and S440 and step S450 has been replaced by step S450c. All other steps in the flowchart of FIG. 18 are identical to the corresponding steps in the flowchart of FIG. 11. S410 in FIG. 18 is identical to S100 in FIG. 2, and S430 in FIG. 18 is identical to S155a in FIG. 12. Because the profile data 139 is stored in the storage 115 when starting the printing process shown in FIG. 18, in S430 the processor 110 may correct the density-related information Gc, Gm, Gy, and Gk included in the profile data 139 stored in the storage 115 to generate the corrected density-related information Gcx, Gmx, Gyx, and Gkx. In S450c the processor 110 performs a tone correction process using the corrected density-related information Gcx, Gmx, Gyx, and Gkx. Thus, the processor 110 performs a tone correction process using the corrected density-related information Gcx, Gmx, Gyx, and Gkx instead of the density-related information Gc, Gm, Gy, and Gk in the printing process of FIG. 18. Accordingly, the processor 110 can bring the printed colors closer to the colors printed by a standard print execution unit.

D. Variations of the Embodiments (1) Any of various processes for generating control data may be used in place of the processes described above. For example, the offset information 134 may be information specifying the calibration values Cc, Cm, Cy, and Ck themselves rather than offsets (Vbb and Vgb) corresponding to the calibration values Cc, Cm, Cy, and Ck. In this case, the calibration table information 136 (see FIG. 3) may be omitted. Alternatively, the offset information 134 may be any of various values specifying offsets between actual ink usage and standard ink usage, and is not limited to ratios of standard ink usage to actual ink usage. The process for correcting control data based on correction values identified using the offset information 134 (for example, S130 of FIG. 2 and S155a of FIG. 12) may be various processes for performing suitable corrections based on calibration values.

Further, the reading unit 160 may be used in the process for generating control data in place of the colorimeter 200. For example, in S120 and S150 of FIG. 2 the processor 110 may use the scan values specified in the read data generated by the reading unit 160 to calculate color density values, which are color values related to optical density. Here, luminance may be used as the color density value (where the greater the luminance, the lower the optical density). The processor 110 uses the color density values to set the dot gradation table information 137, as in the first embodiment described in FIGS. 4(B) and 4(C). The processor 110 also uses the color density values to set the density-related information Gc, Gm, Gy, and Gk, as in the first embodiment described in FIGS. 8(A)-8(C). Also in S170 of FIG. 2, the processor 110 uses scan values (color values in the RGB color space, for example) specified in read data received from the reading unit 160 in place of the colorimetric values. The processor 110 may also use target scan values in place of the target colorimetric values.

(2) Rather than a process using an error diffusion method, the halftone process may be another process, such as one using dither matrices. When using dither matrices, a standard dither matrix must be prepared in advance. Hence, a corrected dither matrix may be produced by correcting the standard dither matrix using the offset information 134.

(3) The print execution unit 170 may have any configuration for printing images. For example, the number of dot sizes that the print execution unit 170 can print is not limited to the three dot sizes large, medium, and small, but may be any number of dot sizes greater than or equal to 1. The ink used for cyan, magenta, and yellow may be a pigment-based ink, and the ink used for black may be a dye-based ink. The combination of available ink is arbitrary and not limited to the CMYK combination. The print execution unit 170 may also be a laser-type print execution unit.

(4) A generating apparatus that generates control data, such as the density-related information Gc, Gm, Gy, and Gk, the dot gradation table information 137, and the color conversion information 138, may be any of various devices other than the MFP 100 (a personal computer, for example). Further, the print execution unit 170 may be an external device connected to the generating apparatus. Further, the functions implemented in the generation process performed by the generating apparatus may be shared among a plurality of devices (computers, for example) that can communicate with each other over a network so that the devices as a whole can provide the functions of the generation process. (Here, the system including the devices corresponds to the generating apparatus.)

The processor 110 may performs any combination of all processes and steps described in the above embodiments.

Part of the configuration implemented in hardware in the embodiments described above may be replaced by software and, conversely, part of the configuration implemented in software may be replaced by hardware. For example, the function of S170 shown in FIG. 2 may be implemented by a dedicated hardware circuit.

When all or part of the functions in the present disclosure are implemented by computer programs, the programs can be stored on a computer-readable storage medium (a non-temporary storage medium, for example). The programs may be used from the same storage medium on which they are provided (an example of a computer-readable storage medium), or may be first loaded onto a different storage medium (an example of a computer-readable storage medium). The "computer-readable storage medium" may be a portable medium, such as a memory card or CD-ROM; an internal storage device built into the computer, such as any of various ROM; or an external storage device, such as a hard disk drive connected to the computer.

While the disclosure has been described in detail with reference to the above embodiments, it would be apparent to those skilled in the art that various changes and modifications may be made thereto.

What is claimed is:

1. A data generating apparatus comprising a processor configured to perform:

acquiring offset information indicating a deviation in a colorant usage used by a specific print execution unit from a standard amount of usage, the specific print execution unit being one of a plurality of print execution units, the standard amount of usage being a standard quantity concerning colorant used by the plurality of print execution units;

controlling the specific print execution unit to print a first patch image based on first patch image data;

generating first control data using first read data obtained by optically reading the first patch image, the first control data being for color correction in printing processes performed on the plurality of print execution units;

generating corrected first control data by correcting the first control data using the offset information, the corrected first control data being for use in the specific print execution unit;

controlling the specific print execution unit to print a second patch image based on second patch image data using the corrected first control data; and generating second control data using second read data obtained by optically reading the second patch image, the second control data being for color correction in the printing processes performed on the plurality of print execution units, wherein the first patch image includes a first patch, a second patch, a third patch, a fourth patch, a fifth patch and a sixth patch, wherein the first patch is formed with small dots of a first color, wherein the second patch is formed with large dots of the first color, wherein the third patch is formed with middle dots of the first color, the middle dots being larger than the small dots and smaller than the large dots, wherein the fourth patch is formed with small dots of a second color, the second color being different from the first color, wherein the fifth patch is formed with large dots of the second color, and wherein the sixth patch is formed with middle dots of the second color, the middle dots being larger than the small dots and smaller than the large dots.

2. The data generating apparatus according to claim 1, wherein the first patch image includes a seventh patch, an eighth patch, and a ninth patch, wherein the seventh patch is formed with the small dots of a first color, a density value of the seventh patch being different from a density value of the first patch, wherein the eighth patch is formed with the large dots of the first color, a density value of the eighth patch being different from a density value of the second patch, wherein the ninth patch is formed with the middle dots of the first color, a density value of the ninth patch being different from a density value of the third patch.

3. The data generating apparatus according to claim 1, wherein the second patch image includes a tenth patch, an eleventh patch, a twelfth patch and a thirteenth patch, wherein the tenth patch is formed with dots of the first color, wherein the eleventh patch is formed with dots of the first color, a gradation value of the eleventh patch being different from a gradation value of the tenth patch, wherein the twelfth patch is formed with dots of the second color, and wherein the thirteenth patch is formed with dots of the second color, a gradation value of the twelfth patch being different from a gradation value of the thirteenth patch.

4. The data generating apparatus according to claim 3, wherein the first patch image is separated from the second patch image.

5. The data generating apparatus according to claim 1, wherein the first control data and the corrected first control data are generated for use in a halftone process,
wherein the second control data is generated for use in a color conversion process,
wherein when controlling the specific print execution unit to print the second patch image, the processor is configured to further perform:
generating print data for the second patch image by performing the halftone process on the second patch image data by using the corrected first control data; and
outputting the generated print data to the specific print execution unit to print the second patch image.

6. The data generating apparatus according to claim 5, wherein the processor is configured to further perform:
controlling the specific print execution unit to print a third patch image based on third patch image data by using the corrected first control data; and
generating third control data using third read data obtained by optically reading the third patch image, the third control data being for color correction in the printing processes performed on the plurality of print execution units,
wherein the processor is configured to perform controlling the specific print execution unit to print the second patch image using the corrected first control data and the third control data.

7. The data generating apparatus according to claim 6, wherein the third control data is generated for use in a tone correction process.

8. The data generating apparatus according to claim 1, wherein when generating the first control data, the processor is configured to further perform:
specifying a specific relationship between an input color value and a read color value, the input color value being a color value indicated by the first patch image data, the read color value being a color value read from the first read image,
specifying a standard relationship between the input color value and the read color value based on the specific relationship,
wherein the processor is configured to perform generating the first control data using the standard relationship.

9. The data generating apparatus according to claim 1, wherein the first control data and the corrected first control data are generated for use in a tone correction process,
wherein the second control data is generated for use in a color conversion process,
wherein when controlling the specific print execution unit to print the second patch image, the processor is configured to further perform:
generating print data for the second patch image by performing the tone correction process on the second patch image data by using the corrected first control data; and
outputting the generated print data to the specific print execution unit to print the second patch image.

10. The data generating apparatus according to claim 9, wherein the processor is configured to further perform:

controlling the specific print execution unit to print a third patch image based on third patch image data; and
generating third control data using third read data obtained by optically reading the third patch image, the third control data being for color correction in the printing processes performed on the plurality of print execution units,
wherein the processor is configured to perform controlling the specific print execution unit to print the first patch image based on the first patch image data by using the third control data,
wherein the processor is configured to perform generating the print data for the second patch image by using the corrected first control data and the third control data.

11. The data generating apparatus according to claim 10, wherein the third control data is generated for use in a halftone process,
wherein when controlling the specific print execution unit to print the second patch image, the processor is further configured to perform generating print data for the second patch image by performing the tone correction process on the second patch image data using the corrected first control data and by performing the halftone process using the third control data.

12. A non-transitory computer readable storage medium storing a set of program instructions for installed on and executed by a computer, the set of program instructions comprising:
acquiring offset information indicating a deviation in a colorant usage used by a specific print execution unit from a standard amount of usage, the specific print execution unit being one of a plurality of print execution units, the standard amount of usage being a standard quantity concerning colorant used by the plurality of print execution units;
controlling the specific print execution unit to print a first patch image based on first patch image data;
generating first control data using first read data obtained by optically reading the first patch image, the first control data being for color correction in printing processes performed on the plurality of print execution units;
generating corrected first control data by correcting the first control data using the offset information, the corrected first control data being for use in the specific print execution unit;
controlling the specific print execution unit to print a second patch image based on second patch image data using the corrected first control data; and
generating second control data using second read data obtained by optically reading the second patch image, the second control data being for color correction in the printing processes performed on the plurality of print execution units;
wherein the first patch image includes a first patch, a second patch, a third patch, a fourth patch, a fifth patch and a sixth patch,
wherein the first patch is formed with small dots of a first color,
wherein the second patch is formed with large dots of the first color,
wherein the third patch is formed with middle dots of the first color, the middle dots being larger than the small dots and smaller than the large dots,
wherein the fourth patch is formed with small dots of a second color, the second color being different from the first color, wherein the fifth patch is formed with large dots of the second color, and wherein the sixth patch is formed with middle dots of the second color, the middle dots being larger than the small dots and smaller than the large dots.

13. The non-transitory computer readable storage medium according to claim 12, wherein the first control data and the corrected first control data are generated for use in a halftone process, wherein the second control data is generated for use in a color conversion process, wherein the set of program instructions further comprises, when controlling the specific print execution unit to print the second patch image:

generating print data for the second patch image by performing the halftone process on the second patch image data by using the corrected first control data; and outputting the generated print data to the specific print execution unit to print the second patch image.

14. The non-transitory computer readable storage medium according to claim 13, wherein the set of program instructions further comprises:

controlling the specific print execution unit to print a third patch image based on third patch image data by using the corrected first control data; and generating third control data using third read data obtained by optically reading the third patch image, the third control data being for common color correction in the printing processes performed on the plurality of print execution units, wherein the second patch image is generated using the corrected first control data and the third control data.

15. The non-transitory computer readable storage medium according to claim 14, wherein the third control data is generated for use in a tone correction process.

16. The non-transitory computer readable storage medium according to claim 12, wherein the set of program instructions further comprises, when generating the first control data:

specifying a specific relationship between an input color value and a read color value, the input color value being a color value indicated by the first patch image data, the read color value being a color value read from the first read image, specifying a standard relationship between the input color value and the read color value based on the specific relationship, wherein the first control data is generated using the standard relationship.

17. The non-transitory computer readable storage medium according to claim 12, wherein the first control data and the corrected first control data are generated for use in a tone correction process, wherein the second control data is generated for use in a color conversion process, wherein the set of program instructions further comprises, when controlling the specific print execution unit to print the second patch image:

generating print data for the second patch image by performing the tone correction process on the second patch image data by using the corrected first control data; and outputting the generated print data to the specific print execution unit to print the second patch image.

18. The non-transitory computer readable storage medium according to claim 17, wherein the set of program instructions further comprises:

controlling the specific print execution unit to print a third patch image based on third patch image data; and generating third control data using third read data obtained by optically reading the third patch image, the third control data being for color correction in the printing processes performed on the plurality of print execution units, wherein the first patch image is generated based on the first patch image data by using the third control data, wherein the print data for the second patch image is generated by using the corrected first control data and the third control data.

19. The non-transitory computer readable storage medium according to claim 18, wherein the third control data is generated for use in a halftone process, wherein the set of program instructions further comprises, when controlling the specific print execution unit to print the second patch image generating print data for the second patch image by performing the tone correction process on the second patch image data using the corrected first control data and by performing the halftone process using the third control data.

20. A method comprising:

acquiring offset information indicating a deviation in a colorant usage used by a specific print execution unit from a standard amount of usage, the specific print execution unit being one of a plurality of print execution units, the standard amount of usage being a standard quantity concerning colorant used by the plurality of print execution units;

controlling the specific print execution unit to print a first patch image based on first patch image data;

generating first control data using first read data obtained by optically reading the first patch image, the first control data being for color correction in printing processes performed on the plurality of print execution units;

generating corrected first control data by correcting the first control data using the offset information, the corrected first control data being for use in the specific print execution unit;

controlling the specific print execution unit to print a second patch image based on second patch image data using the corrected first control data; and generating second control data using second read data obtained by optically reading the second patch image, the second control data being for color correction in the printing processes performed on the plurality of print execution units;

wherein the first patch image includes a first patch, a second patch, a third patch, a fourth patch, a fifth patch and a sixth patch, wherein the first patch is formed with small dots of a first color, wherein the second patch is formed with large dots of the first color, wherein the third patch is formed with middle dots of the first color, the middle dots being larger than the small dots and smaller than the large dots, wherein the fourth patch is formed with small dots of a second color, the second color being different from the first color, wherein the fifth patch is formed with large dots of the second color, and wherein the sixth patch is formed with middle dots of the second color, the middle dots being larger than the small dots and smaller than the large dots.

* * * * *

UNITED STATES PATENT AND TRADEMARK OFFICE
CERTIFICATE OF CORRECTION

PATENT NO. : 11,178,310 B2
APPLICATION NO. : 16/896850
DATED : November 16, 2021
INVENTOR(S) : Yasunari Yoshida It is certified that error appears in the above-identified patent and that said Letters Patent is hereby corrected as shown below:

In the Claims

Column 28, Claim 2, Line 50 should read:
of the first color, a density value of the seventh patch Column 32, Claim 19, Line 19 should read:
print the second path image, generating print data for Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*